(12) United States Patent
Euzen et al.

(10) Patent No.: US 7,879,224 B2
(45) Date of Patent: Feb. 1, 2011

(54) DOPED ALUMINO-SILICATE CATALYST AND IMPROVED PROCESS FOR TREATMENT OF HYDROCARBON FEEDS

(75) Inventors: Patrick Euzen, Paris (FR); Alexandra Chaumonnot, Lyons (FR); Magalie Roy-Auberger, Bourgoin Jallieu (FR); Patrick Bourges, Lyons (FR); Tivadar Cseri, Saint Chamond (FR); Maryline Delage, Rueil Malmaison (FR); Nathalie Lett, La Mulatiere (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 886 days.

(21) Appl. No.: 11/663,497

(22) PCT Filed: Sep. 20, 2005

(86) PCT No.: PCT/FR2005/002332

§ 371 (c)(1),
(2), (4) Date: Mar. 22, 2007

(87) PCT Pub. No.: WO2006/032782

PCT Pub. Date: Mar. 30, 2006

(65) Prior Publication Data
US 2009/0188834 A1    Jul. 30, 2009

(30) Foreign Application Priority Data
Sep. 22, 2004    (FR) .................................. 04 09997

(51) Int. Cl.
*C10G 11/02*    (2006.01)
*B01J 27/185*    (2006.01)

(52) U.S. Cl. .................. 208/114; 208/108; 208/109; 208/110; 208/111.3; 208/111.35; 208/121; 502/208; 502/210; 502/211; 502/213; 502/204; 502/206; 502/207

(58) Field of Classification Search ............... 208/111.3
See application file for complete search history.

(56) References Cited

U.S. PATENT DOCUMENTS

| | | | |
|---|---|---|---|
| 3,666,685 | A | 5/1972 | O'Hara |
| 4,857,494 | A | 8/1989 | Martinez |
| 5,370,788 | A | 12/1994 | Dai et al. |
| 2002/0160911 | A1* | 10/2002 | Benazzi et al. ............... 502/240 |
| 2003/0089636 | A1* | 5/2003 | Marchionna et al. .......... 208/87 |
| 2004/0138059 | A1* | 7/2004 | Euzen et al. ............. 208/111.3 |
| 2006/0070915 | A1* | 4/2006 | Euzen et al. ............. 208/111.3 |

FOREIGN PATENT DOCUMENTS

| | | |
|---|---|---|
| EP | 0325827 A | 8/1989 |
| FR | 2 667 610 A | 4/1992 |
| JP | 2000 135437 A | 5/2000 |
| WO | WO 02/055192 A | 7/2002 |

* cited by examiner

*Primary Examiner*—Glenn A Caldarola
*Assistant Examiner*—Michelle L Stein
(74) *Attorney, Agent, or Firm*—Millen, White, Zelano & Branigan, P.C.

(57) ABSTRACT

The present invention concerns doped catalysts on an alumino-silicate support with an adapted macropore content and hydrocracking/hydroconversion and hydrotreatment processes employing them. The catalyst comprises at least one hydrodehydrogenating element selected from the group formed by elements from group VIB and group VIII of the periodic table, a controlled quantity of phosphorus (optionally in combination with boron and/or silicon) as a doping element, and a non-zeolitic support based on alumina-silica containing a quantity of more than 5% by weight and 95% by weight or less of silica ($SiO_2$).

39 Claims, No Drawings

US 7,879,224 B2

DOPED ALUMINO-SILICATE CATALYST AND IMPROVED PROCESS FOR TREATMENT OF HYDROCARBON FEEDS

FIELD OF THE INVENTION

The present invention relates to doped catalysts on alumino-silicate supports and hydrocracking, hydroconversion and hydrotreatment processes employing them.

The aim of the process is essentially the production of middle distillates, i.e. cuts with an initial boiling point of at least 150° C. and an end point just below the initial boiling point of the residue, for example less than 340° C. or 370° C.

PRIOR ART

Hydrocracking heavy petroleum cuts is a very important refining process which can produce, from superfluous low value feeds, lighter fractions such as gasoline, jet fuel and light gas oil which the refiner needs in order to adapt production to demand. Certain hydrocracking processes can also produce a highly purified residue which can provide excellent bases for oils. Compared with catalytic cracking, the advantage of catalytic hydrocracking is that very high quality middle distillates, jet fuels and gas oils can be provided. In contrast, the gasoline produced has a much lower octane number than that from catalytic cracking.

Hydrocracking is a process which owes its flexibility to three principal elements namely the operating conditions used, the types of catalyst employed and the fact that hydrocracking of hydrocarbon feeds may be carried out in one or two steps.

The hydrocracking catalysts used in hydrocracking processes are all bifunctional in type, associating an acid function with a hydrogenating function. The acid function is supplied by supports with surface areas generally of 150 to 800 $m^2/g$ and with a superficial acidity, such as halogenated aluminas (chlorinated or fluorinated), combinations of oxides of boron and aluminium, amorphous alumina-silicas and zeolites. The hydrogenating function is supplied either by one or more metals from group VIII of the periodic table, or by a combination of at least one metal from group VIB of the periodic table and at least one group VIII metal.

The balance between the two functions, acid and hydrogenating, is one parameter which governs the activity and selectivity of the catalyst. A weak acid function and a strong hydrogenating function produces less active catalysts, generally working at a high temperature (390-400° C. or more), and a low hourly space velocity (HSV, expressed as the volume of feed to be treated per unit volume of catalyst per hour, generally 2 or less), but endowed with very high selectivity for middle distillates. In contrast, a strong acid function and a weak hydrogenating function produce active catalysts, but they have lower selectivities for middle distillates (jet fuels and gas oils).

One conventional hydrocracking catalyst type is based on moderately acidic amorphous supports, such as alumina-silicas. Said systems are used to produce good quality middle distillates, and possibly base oils. Said catalysts are, for example, used in two-step processes.

International patent application WO-A-02/055192 describes a catalyst used in processes for hydrocracking hydrocarbon feeds comprising at least one silica alumina, said silica alumina having a silica content in the range 10% to 60% by weight, a Na content of less than 300 ppm by weight, a total pore volume in the range 0.5 to 1.2 ml/g measured by mercury porosimetry, the porosity of the silica alumina being as follows: the volume of mesopores with a diameter in the range 40 to 150 Å and with a mean diameter in the range 80 to 120 Å represents 30-80% of the total pore volume; the volume of macropores with a diameter of more than 500 Å represents 20-80% of the total pore volume; the BET specific surface area is more than 200 $m^2/g$; and at least one hydro-dehydrogenating element is selected from the group formed by elements from group VIB and group VIII of the periodic table. Said catalyst may optionally contain at least one element selected from the group formed by phosphorus, boron and silicon, group VIIA and an element from groups VIIB and VB. The use of this type of catalyst to hydrocrack hydrocarbon feeds can produce high conversions of the feed and advantageous middle distillate selectivities.

A further document, EP-A-0 686 687, describes a catalyst used in a mild hydrocracking process for heavy hydrocarbon feeds. The catalyst comprises 2% to 6% by weight of a group VIII oxide, 12% to 25% by weight of molybdenum oxide and 0 to 3% by weight of a phosphorus oxide, said catalyst being supported on a porous alumina support containing 4% to 30% of silica. The catalyst has a BET specific surface area in the range 150 to 250 $m^2/g$, a total pore volume in the range 0.75 to 0.92 $cm^3/g$ and a pore distribution such that the pores having a diameter of less than 10 nm constitute 20% to 40% of the total pore volume, pores with a diameter in the range 10 to 16 nm constitute 28.4% to 34.1% of the total pore volume, pores with a diameter of more than 16 nm constitute 30% to 50% of the total pore volume and macropores with a diameter of more than 25 nm represent 25% to 40% of the total pore volume. The use of such a catalyst in a mild hydrocracking process can avoid the formation of insoluble sediments which may clog the reactor of the downstream unit, and avoid a high degree of conversion.

The performance of these catalysts is closely linked to their physico-chemical characteristics, more particularly their textural characteristics. It is advantageous to reduce the packing density of the catalysts to minimize costs and maintain good catalytic performance. In this regard, it is advantageous to use catalysts with a total pore volume which is adapted by introducing macropores (the term "macropores" means pores with a diameter of more than 500 Å). Despite a higher total pore volume, good catalytic activity is maintained while reducing catalyst costs.

While good performance may be obtained by improving the textural characteristics, the performance of such catalysts is also linked to the nature of the hydrogenating phase. The hydrogenating activity will thus play a role in hydrodesulphurization (HDS) reactions, hydrodenitrogenation (HDN) reactions, hydrodearomatization (HAD) reactions and in catalyst stability.

In wishing to overcome these problems, the Applicant prepared hydrocracking catalysts with an adapted macropore content and with an improved hydrogenating function to obtain improved catalytic performances in hydrocracking processes. The Applicant thus, surprisingly, discovered that adding a controlled percentage of doping elements to catalysts with such textural characteristics resulted in unexpected catalytic performances in hydrocracking/hydroconversion and in hydrotreatment.

More precisely, the invention concerns a doped hydrocracking catalyst on an alumino-silicate support with an adapted macropore content and hydrocracking/hydroconversion and hydrotreatment processes employing it.

Characterization Techniques

In the following description, the term "specific surface area" means the BET specific surface area determined by nitrogen adsorption in accordance with ASTM D 3663-78 established using the BRUNAUER-EMMETT-TELLER method described in "The Journal of the American Society", 60, 309 (1938).

In the following description, the term "mercury volume" of catalyst supports means the volume measured by mercury porosimetric intrusion in accordance with ASTM D4284-83 at a maximum pressure of 4000 bars, using a surface tension of 484 dynes/cm and a contact angle for amorphous silica-alumina catalysts of 140°. One reason why it is preferable to use a support as a base to define the pore distribution is that the mercury contact angle varies after impregnating metals as a function of the nature and type of metals. The wetting angle is taken to be 140°, following the recommendations in the work "Techniques de l'ingénieur, traité analyse et caractérisation", pages 1050-5, by Jean Charpin and Bernard Rasneur.

For greater accuracy, the value of the mercury volume in ml/g given in the text below corresponds to the total mercury volume (total mercury volume measured by mercury porosimetry intrusion) in ml/g measured for the sample minus the value of the mercury volume in ml/g measured for the same sample for a pressure corresponding to 30 psi (about 2 bars). The mean mercury diameter is also defined, as the diameter for which all pores with a size less than this diameter constitute 50% of the total mercury pore volume.

To better characterize the pore distribution, we define the criteria fir the mercury pore distribution characteristics: volume V1' corresponds to the volume of macropores with a diameter greater than 500 A and volume V2' that corresponds to the volume of macropores with a diameter greater than 250 A. To better characterize the pore distribution, we finally define the following criteria for the mercury pore distribution characteristics: volume V1 corresponds to the volume contained in pores for which the diameter is less than the mean diameter minus 30 Å. Volume V2 corresponds to the volume contained in pores with a diameter greater than or equal to the mean diameter minus 30 Å and less than the mean diameter plus 30 Å. Volume V3 corresponds to the volume contained in pores with a diameter greater than or equal to the mean diameter plus 30 Å. Volume V4 corresponds to the volume contained in pores with a diameter of less than the mean diameter minus 15 Å. Volume V5 corresponds to the volume contained in pores with a diameter greater than or equal to the mean diameter minus 15 Å and less than the mean diameter plus 15 Å. Volume V6 corresponds to the volume contained in pores with a diameter greater than or equal to the mean diameter plus 15 Å.

The pore distribution measured by nitrogen adsorption is determined by the Barrett-Joyner-Halenda model (BJH). The nitrogen adsorption-desorption isotherm using the BJH model is described in the periodical "The Journal of the American Society", 73, 373 (1951) by E P Barrett, L G Joyner and PP Halenda. In the description below, the term "nitrogen adsorption volume" means the volume measured for $P/P0=0.99$, the pressure at which it is assumed that the nitrogen has filled all of the pores. The mean nitrogen desorption diameter is defined as a diameter such that all of the pores below this diameter constitute 50% of the pore volume ($V_p$) measured on the nitrogen isotherm desorption branch.

The term "surface adsorption" means the surface measured on the adsorption isotherm branch. Reference should be made to the article by A Lecloux in "Mémoires de la Société Royale des Sciences de Liège", 6$^{th}$ series, volume 1, section 4, pp 169-209 (1971).

The sodium content is measured by atomic absorption spectrometry.

X ray diffraction is a technique which can be used to characterize the supports and catalysts of the invention. In the description below, the X ray analysis was carried out on powder with a Philips PW 1830 diffractometer operating in reflection mode and provided with a back monochromator using the CoKalpha radiation line ($\lambda K_{\alpha 1}$=1.7890 Å, $\lambda IK_{\alpha 2}$=1.793 Å, $K_{\alpha 1}/K_{\alpha 2}$ intensity ratio=0.5). Reference should be made to the ICDD database, number 10-0425, for the X ray diffraction diagram of gamma alumina. In particular, the 2 most intense peaks are located at a position corresponding to a d in the range 1.39 to 1.40 Å and to a d in the range 1.97 Å to 2.00 Å. The term "d" is the interplanar spacing which is deduced from the angular position using the Bragg relationship ($2d_{(hkl)}*\sin(\theta)=n*\lambda$). The term "gamma alumina" as used in the remainder of the text means, inter alia, for example, an alumina included in the group composed of cubic gamma, pseudo-cubic gamma, tetragonal gamma, low crystallinity or poorly crystallized gamma, high surface area gamma, low surface area gamma, gamma from coarse boehmite, gamma from crystalline boehmite, gamma from low crystallinity or poorly crystallized boehmite, gamma from a mixture of crystalline boehmite and an amorphous gel, gamma from an amorphous gel, and gamma developing towards delta alumina. Reference should be made to the article by B C Lippens, J J Steggerda in "Physical and Chemical Aspects of Adsorbents and Catalysts" by E G Linsen (Ed), Academic Press, London, 1970, p 171-211 for the diffraction peaks for eta, delta and theta aluminas.

For the supports and catalysts of the invention, the X ray diffraction diagram discloses a broad peak which is characteristic of the presence of amorphous silica.

Further, in the following text, the alumina compound may contain an amorphous fraction which is difficult to detect by XRD techniques. This therefore means that the alumina compounds used or described in the text may contain an amorphous or low crystallinity fraction.

The supports and catalysts of the invention were analyzed by solid $^{27}Al$ MAS NMR using a Brüker MSL 400 type spectrometer with a 4 mm probe. The sample rotation rate was of the order of 11 kHz. Aluminium NMR can potentially distinguish between three types of aluminium which have the following chemical displacements:

between 100 and 40 ppm, tetra-coordinated type aluminium, $Al_{IV}$;

between 40 and 20 ppm, penta-coordinated type aluminium, $Al_V$;

between 20 and −100 ppm, hexa-coordinated type aluminium, $Al_{VI}$;

The aluminium atom is a quadripolar nucleus. Under certain analytical conditions (weak radiofrequency field: 30 kHz, low pulse angle: π/2 and water-saturated sample), the magic angle spinning (MAS) NMR technique is a quantitative technique. The decomposition of MAS NMR spectra allows direct access to the quantity of the different species. The spectrum is calibrated as the chemical displacement with respect to a 1 M aluminium nitrate solution. The aluminium signal is at zero ppm. We elected to integrate the signals between 100 and 20 ppm for $Al_{IV}$ and $Al_V$, which corresponds to area 1, and between 20 and −100 for $Al_{VI}$ which corresponds to area 2. In the following description, the term "proportion of octahedral $Al_{VI}$" means the following ratio: area 2/(area 1+area 2).

The silicon environment in the alumina-silicas was studied by $^{29}Si$ NMR. The tables of chemical displacement as a function of the degree of condensation were deduced from the work by G Engelhardt and D Michel: "High resolution solid-state NMR of silicates and zeolites" (Wiley), 1987.

$^{29}$Si NMR shows the chemical displacements of different species of silicon such as $Q^4$ (−105 ppm to −120 ppm), Q3 (−90 ppm to −102 ppm) and Q2 (−75 ppm to −93 ppm). Sites with a chemical displacement at −102 ppm may be sites of type Q3 or $Q^4$, which we have termed $Q3^{-4}$ sites. The sites are defined as follows:

$Q^4$ sites: Si bonded to 4 Si (or Al);
$Q^3$ sites: Si bonded to 3 Si (or Al) and 1 OH;
$Q^2$ sites: Si bonded to 2 Si (or Al) and 2 OH;

The alumina-silicas of the invention are composed of silicon of types $Q^2$, $Q^3$, $Q^{3-4}$ and $Q^4$. Many species will be of type $Q^2$, approximately of the order of 10% to 80%, preferably 20% to 60% and more preferably 20% to 40%. The proportion of $Q^3$ and $Q^{3-4}$ species is also high, approximately of the order of 5% to 50% and preferably 10% to 40% for the two species.

The environment for the silicon atoms was studied by MAS NMR CP $^1$H->$^{29}$Si (300 MHz, rotation rate: 4000 Hz). In this case, only silicon bonded to OH bonds responds. The table of chemical displacements used was that from Kodakari et al, Langmuir 14, 4623-4629, 1998. The following attributions are made: −108 ppm ($Q^4$), −99 ppm ($Q^3$/$Q^4$(1 Al)), −91 ppm ($Q^3$/$Q^3$(1 Al)), −84 ppm ($Q^2$/$Q^3$(2 Al)), −78 ppm ($Q^2$/$Q^3$(3 Al)) and −73 ppm ($Q^1$/$Q^2$(3 Al)). The alumina-silicas of the invention are in the form of a superimposition of several masses. The principal peak of these masses is generally located at −110 ppm.

One method for characterizing the catalysts of the invention which may be used is transmission electron microscopy (TEM). To this end, an electron microscope (of the Jeol 2010 or Philips Tecnai20F type, with optional scanning) was used, provided with an energy dispersion spectrometer (EDS) for X ray analysis (for example a Tracor or Edax). The EDS detector has to allow detection of light elements. The combination of the two tools, TEM and EDS, can combine imagery and local chemical analysis with good spatial resolution.

For this type of analysis, the samples are finely ground in a mortar; the powder is then included in resin to produce ultrafine sections with a thickness of about 70 nm. Such sections are collected on copper grids coated with a film of perforated amorphous carbon acting as a support. They are then introduced into the microscope for observation and analysis under high vacuum. With imagery, the sample zones are readily distinguished from the resin zones. A certain number of analyses are then carried out, a minimum of 10, preferably in the range 15 to 30, on different zones of the industrial sample. The size of the electron beam for zone analysis (approximately determining the size of the analyzed zones) is 50 nm in diameter as a maximum, preferably 20 nm, and more preferably 10, 5, 2 or 1 nm in diameter. In scanning mode, the analyzed zone will be a function of the size of the scanned zone and not the size of the beam, which is generally less.

Semi-quantitative processing of X ray spectra recorded using the EDS spectrometer can produce the relative concentration of Al and Si (as an atomic %) and the Si/Al ratio for each of the analyzed zones. The mean Si/Al$_m$ and the standard deviation C of this set of measurements can then be calculated. In the non limiting examples of the description which follows, the 50 nm probe was used to characterize the supports and catalysts of the invention unless otherwise indicated.

The settled packing density (SPD) was measured as described in "Applied Heterogeneous Catalysis" by J F Le Page, J Cosyns, P Courty, E Freund, J-P Franck, Y Jacquin, B Juguin, C Marcilly, G Martino, J Miquel, R Montamal, A Sugier, H Van Landehchem, Technip, Paris, 1987. A suitably sized graduated cylinder is filled by successive additions and, between two successive additions, the catalyst is settled by shaking the cylinder to constant volume. This measurement is generally carried out on 1000 cm$^3$ of catalyst packed into a cylinder with a height to diameter ratio of close to 5:1. This measurement is preferably carried out using automated apparatus such as the Autotap® sold by Quantachrome®.

The acidity of the matrix is measured by IR. The IR spectra were recorded on a Nicolet Nexus-670 type interferometer at a resolution of 4 cm$^{-1}$ with Happ-Gensel type apodisation. The sample (20 mg) was pressed into a self-supporting pellet and placed in an in situ analytical cell (25° C. to 550° C., furnace offset from IR beam, high vacuum of 10$^{-6}$ mbars). The pellet diameter was 16 mm.

The sample was pre-treated as follows to eliminate physisorbed water and to partially dehydroxylate the catalyst surface to provide an image which was representative of the catalyst acidity when in operation:

temperature rise from 25° C. to 300° C. over 3 hours;
iso-temperature for 10 hours at 300° C.;
temperature fall from 300° C. to 25° C. over 3 hours.

The basic probe (pyridine) was then adsorbed at saturated pressure at 25° C. then thermo-desorbed in the following stages:

25° C. for 2 hours under high vacuum;
100° C. for 1 hour under high vacuum;
200° C. for 1 hour under high vacuum;
300° C. for 1 hour under high vacuum.

A spectrum was recorded at 25° C. at the end of the pre-treatment and at each desorption stage in transmission mode with an accumulation time of 100 s. The spectra were recorded at iso-mass (and thus assumed to be iso-thickness) (exactly 20 mg). The number of Lewis sites is proportional to the surface area of the peak with a maximum near 1450 cm$^{-1}$, including shoulders. The number of Bronsted sites is proportional to the surface area of the peak with a maximum near 1545 cm$^{-1}$. The ratio of the number of Bronsted sites/number of Lewis sites, B/L, is estimated to be equal to the ratio of the surface areas of the two peaks described above. In general, the surface areas of the peaks at 25° C. are used. This ratio B/L is generally calculated from the spectrum recorded at 25° C. at the end of pre-treatment.

When a doping element is introduced, for example P and possibly B and/or Si, its distribution and location may be determined by techniques such as a Castaing microprobe (distribution profile of the various elements), a transmission electron microscope coupled to X ray analysis of the catalyst components, or by establishing a distribution map of the elements present in the catalyst by electronic microprobe. These techniques can show the presence of these exogenous elements added after synthesis of the alumina-silica of the invention.

The overall composition of the catalyst may be determined by X ray fluorescence of the catalyst in the powdered state or by atomic absorption after acid attack of the catalyst.

The local composition on the micronic scale, as opposed to the overall composition of the catalyst, may be measured by electronic microprobe. This measurement may be made by determining the amounts of metal in zones of a few cubic microns along the diameter of a particle of catalyst which is termed the measurement unit. This measurement allows the macroscopic distribution of the elements inside the particles to be evaluated. It may optionally be supplemented on the nanometric scale by STEM (scanning transmission electron microscopy).

The analyses are carried out using a CAMECA SX100 electronic microprobe (provided with 5 wavelength dispersion spectrometers) (preferred apparatus) or optionally using a JEOL 8800R (4 spectrometers). The acquisition parameters were as follows: acceleration voltage 20 kV, current 80 or 200 nA and count time 10 s or 20 s depending on the concentration. The particles are coated in resin then polished to diameter.

It should be noted that the term "diameter" does not refer solely to a shape of a bead or extrudate, but more generally to any form of particles; it is termed the "diameter" because it is the representative length of the particle on which the measurement is made.

The measurements were made on a representative sample of the bed or catalyst batch to be used in the catalytic bed. The analyses should be carried out on at least 5 particles with at least 30 measurements per particle, uniformly distributed along the diameter.

The local concentrations (expressed as a %) of molybdenum, nickel, tungsten and phosphorus are respectively termed CMo, CNi, CW and CP.

It is also possible to express the concentrations as an atomic %; the relative fluctuations are the same.

It may be advantageous to prepare the catalysts having homogeneous concentrations CMo, CNi, CW and CP along the extrudate. It is also advantageous to prepare catalysts having different core and peripheral CMo, CNi, CW and CP concentrations. These catalysts have "dished" or "domed" distribution profiles. A further distribution type is the crust type where the elements of the active phase are distributed on the surface.

DETAILED DESCRIPTION OF THE INVENTION

More precisely, the invention concerns a catalyst comprising:
- at least one hydrodehydrogenating element selected from the group formed by elements from group VIB and group VIII of the periodic table;
- 0.01% to 6% of phosphorus as a doping element (optionally in combination with boron and/or silicon); said catalyst having a total volume pore, measured by mercury porosimetry, in the range 0.35 to 0.74 ml/g,
- and a non-zeolitic support based on alumina-silica;
- said alumina-silica having the following characteristics:
- a percentage of silica in the range 5% to 95% by weight, preferably in the range 10% to 80%, more preferably in the range 20% to 60% and still more preferably the percentage of silica is strictly greater than 25% and less than 50% and still more preferably, strictly greater than 25% and less than 42%.
- a sodium content of less than 0.03% by weight;
- a total pore volume, measured by mercury porosimetry, in the range 0.45 to 0.96 ml/g;
- a porosity such that:
  i) the volume of mesopores with a diameter in the range 40 Å to 150 Å and a mean pore diameter in the range 80 Å to 140 Å (preferably in the range 80 Å to 120 Å) represents 30-80% of the total pore volume measured by mercury porosimetry;
  ii) the volume of macropores with a diameter of more than 500 Å represents 15-80% of the total pore volume measured by mercury porosimetry;
  iii) advantageously, the volume of the pores with diameter of more than 250 Å represents 20-80% of the total pore volume measured by mercury porosimetry, preferably represents 25-60% of the total pore volume and more preferably at least 30% of the total pore volume;
- a BET specific surface area in the range 100 to 550 $m^2/g$, preferably in the range 150 to 500 $m^2/g$, more preferably less than 350 $m^2/g$ and still more preferably less than 250 $m^2/g$;
- an X ray diffraction diagram which contains at least the principal characteristic peaks of at least one of the transition aluminas included in the group composed of alpha, rho, khi, eta, gamma, kappa, theta and delta aluminas.

The invention also concerns a hydrocracking/hydroconversion process, and a process for hydrotreatment of hydrocarbon feeds with said catalysts.

Characteristics of the Catalyst Support of the Invention

The alumina-silica used in the catalyst of the invention is preferably a homogeneous alumina-silica on the micrometric scale in which the cationic impurities content (for example $Na^+$) is less than 0.1% by weight, preferably less than 0.05% by weight and more preferably less than 0.025% by weight and the anionic impurities content (for example $SO_4^{2-}$ or $Cl^-$) is less than 1% by weight, preferably less than 0.5% by weight and more preferably less than 0.1% by weight.

Thus, any alumina-silica synthesis process known to the skilled person leading to a homogeneous alumina-silica on the micrometric scale and in which the cationic impurities content (for example $Na^+$) is collectively less than 0.1% by weight, preferably less than 0.05% by weight and more preferably less than 0.025% by weight, and in which the anionic impurities content (for example $SO_4^{2-}$ or $Cl^-$) is collectively less than 1% by weight, preferably less than 0.05% by weight, is suitable for the preparation of the supports of the invention.

The catalyst support of the invention is a non-zeolitic support based on alumina-silica (i.e. comprising alumina and silica) with a silica ($SiO_2$) content of more than 5% by weight to 95% or less, preferably in the range 10% to 80% by weight, more preferably a silica content of more than 20% by weight and less than 60% by weight and still more preferably the percentage of silica is strictly greater than 25% and less than 50% and still more preferably, strictly greater than 25% and less than 42%.

The percentage of silica has an effect on the catalyst acidity and thus on the catalyst activity. Indeed, en hydroconversion and more particularly in hydrocracking, the conversion of hydrocarbon molecules takes place on acid sites. The interfaces between silica and alumina are responsible of the alumina-silica acidity. The active site is the hydrogen of the hydroxyl group linking between silica and alumina. he global acidity is then dependant on the number of protonic sites. It is increased with the content of silica because the global surface of the silica-alumina interfaces is increased.

In a preferred implementation of the invention, the catalyst support is constituted by alumina-silica alone.

In accordance with a further implementation of the invention, the support comprises 1% to 40% by weight of binder. The support may then result from a mixture of alumina-silica and at least one binder selected from the group formed by silica, alumina, clays, titanium oxide, boron oxide and zirconia.

The environment of the silicon in the alumina-silicas is studied by $^{29}Si$ NMR. The alumina-silicas of the invention are composed of silicon of types $Q^2$, $Q^3$, $Q^{3-4}$ and $Q^4$. Many species will be of type $Q^2$, approximately of the order of 10% to 80%, preferably 20% to 60% and more preferably 30% to 50%. The proportion of $Q^3$ and $Q^{3-4}$-species is also high, approximately of the order of 5% to 50% and preferably 10% to 40% for the two species.

Preferably, the alumina-silica comprises 30% to 50% $Q^2$ sites, in which one atom of Si is bonded to two atoms of Si or Al and to two OH groups, and also comprises 10-30% of $Q^3$ sites, in which one Si atom is bonded to three Si or Al atoms or to one OH group.

The environment for the silicon atoms was studied by MAS NMR CP $^1H$->$^{29}Si$ (300 MHz, rotation rate: 4000 Hz). In this case, only silicon bonded to OH bonds responds. The table of chemical displacements used was that from Kodakari et al, Langmuir 14, 4623-4629, 1998. The following attributions are made: −108 ppm ($Q^4$), −99 ppm ($Q^3/Q^4$(1 Al)), −91 ppm ($Q^3/Q^3$(1 Al)), −84 ppm ($Q^2/Q^3$(2 Al)), −78 ppm ($Q^2/Q^3$(3 Al)) and −73 ppm ($Q^1/Q^2$(3 Al)). The alumina-silicas of the invention are in the form of a superimposition of several masses. The principal peak of these masses is generally located at −110 ppm.

Solid $^{27}Al$ MAS NMR spectra of the supports and catalysts of the invention exhibit two distinct peak masses. A first type of aluminium with a maximum resonating at about 10 ppm extends between −100 and 20 ppm. The position of the maximum suggests that these species are essentially of the $Al_{VI}$ type (octahedral). A second minor type of aluminium with a maximum resonating at about 60 ppm extends between 20 and 110 ppm. This can be decomposed into at least two species. The predominant species here corresponds to $Al_{IV}$ atoms (tetrahedral). For the catalysts used in the process of the present invention, advantageously, the proportion of octahedral $Al_{VI}$ is more than 50%, preferably more than 60%, and more preferably more than 70%.

In one implementation of the invention, the alumina-silica comprises at least two alumino-silicate zones, said zones having Si/Al ratios which are higher or lower than the overall Si/Al ratio determined by X ray fluorescence. Thus, a catalyst having a Si/Al ratio of 0.5 comprises two alumino-silicate zones, one zone with a Si/Al ratio determined by TEM of less than 0.5 and the other zone with a Si/Al ratio determined by TEM in the range 0.5 to 2.5.

In a further implementation of the invention, the catalyst contains a single alumina-silica zone, said zone having a Si/Al ratio equal to the overall Si/Al ratio determined by X ray fluorescence and less than 2.3.

The acidity of the catalyst support used in the process of the invention may advantageously, and without limiting the scope of the invention, be measured by IR monitoring of the thermodesorption of pyridine. In general, the ratio B/L, as described above, of the support of the invention is in the range 0.05 to 1, preferably in the range 0.05 to 0.7, more preferably in the range 0.05 to 0.5.

The diffractograms of the alumina-silicas of the invention obtained by X ray diffraction correspond to a mixture of silica and alumina with a certain development between gamma alumina and silica as a function of the amount of $SiO_2$ in the samples.

The textural characteristics of the alumina-silica used in the catalyst of the invention are as follows:
- a BET specific surface area in the range 100 to 550 m²/g, preferably in the range 150 to 500 m²/g, more preferably less than 350 m²/g and still more preferably less than 250 m²/g;
- a total pore volume, measured by mercury porosimetry, in the range 0.45 to 0.96 ml/g;
- a porosity such that:
  i. the volume of mesopores with a diameter in the range 40 Å to 150 Å and with a mean pore diameter in the range 80 Å to 140 Å (preferably in the range 80 Å to 120 Å) represents 30-80% of the total pore volume as defined above, preferably 40% to 70%;
  ii. the volume of macropores with a diameter of more than 500 Å, preferably in the range 1000 Å to 10000 Å, represents 15-80% of the total pore volume, more preferably the volume of macropores represents at least 35% of the total pore volume;
  iii. advantageously, the volume of the pores with diameter of more than 250 Å represents 20-80% of the total pore volume measured by mercury porosimetry, preferably represents 25-60% of the total pore volume and more preferably at least 30% of the total pore volume;

Characteristics of the Catalyst of the Invention

Thus, the catalyst of the invention comprises:
- preferably, a cationic impurities content of less than 0.1% by weight, more preferably less than 0.05% by weight and still more preferably less than 0.025% by weight. The term "cationic impurities content" means the total alkali content;
- preferably, an anionic impurities content of less than 1% by weight, more preferably less than 0.5% by weight and still more preferably less than 0.1% by weight;
- at least one hydrodehydrogenating element selected from the group formed by elements from group VIB and group VIII of the periodic table;
- preferably, a group VIB metal(s) content, in the metallic form or in the oxide form, in the range 1 to 55% by weight, preferably in the range 1.5% to 35% by weight, more preferably in the range 1.5% to 30% by weight;
- preferably, a group VIII metal content in the metallic form or in the oxide form, in the range 0.1% to 30% by weight, preferably 0.2% to 25% and more preferably in the range 0.2% to 20% by weight;
- 0.01% to 6% of phosphorus as the doping element deposited on the catalyst (the term "doping element" means an element introduced after preparation of the aluminosilicate support described above), optionally in combination with boron and/or silicon. Thus, a combination of phosphorus and boron or a phosphorus, boron and silicon combination may be used as doping elements. When the elements boron and/or silicon are present on the catalyst, the boron and silicon contents, calculated in their oxide form, are in the range 0.01% to 6% by weight, preferably in the range 0.1% to 4% by weight, more preferably in the range 0.2% to 2.5%;
- optionally, at least one group VIIB element (preferably manganese for example), and a content in the range 0 to 20% by weight, preferably in the range 0 to 10% by weight of the compound in the oxide or metallic form;
- optionally, at least one group VB element (preferably niobium for example), and a content in the range 0 to 40% by weight, preferably in the range 0 to 20% by weight of the compound in the oxide or metallic form; the catalyst of the invention has a total volume pore, measured by mercury porosimetry, in the range 0.35 to 0.74 ml/g, and preferably in the range 0.4 to 0.6 ml/g;

The reduction of the total volume pore value leads to the increase of the catalyst density, that allows a more important filling of the reactor and therefore an increase of the treatment unit flow. Moreover, it is proved that it is possible to make profit of the use of a high density catalyst in smaller units. Using such a catalyst allows to debottleneck existing units so that more feedstock could be converted.
- advantageously, the catalyst of the invention contains no fluorine;
- the settled packing density (SPD) of the catalyst is generally greater than 0.7 g/cm3 and is preferably in the range 0.7 to 0.9 g/cm3, due to the porosity characteristics of the catalyst.

a non-zeolitic support based on alumina-silica, said alumina-silica having the following characteristics:

a percentage of silica in the range 5% to 95% by weight, preferably in the range 10% to 80%, more preferably in the range 20% to 60% and still more preferably the percentage of silica is strictly greater than 25% and less than 50% and still more preferably, strictly greater than 25% and less than 42%.

a sodium content of less than 0.03% by weight;

a total pore volume, measured by mercury porosimetry, in the range 0.45 to 0.96 ml/g;

a porosity such that:

i) the volume of mesopores with a diameter in the range 40 Å to 150 Å, and with a mean pore diameter in the range 80 Å to 140 Å (preferably in the range 80 Å to 120 Å) represents 30-80% of the total pore volume as defined above, preferably between 40% and 70%;

ii) the volume of macropores with a diameter of more than 500 Å, preferably in the range 1000 Å to 10000 Å, represents 15-80% of the total pore volume, preferably in the range 30% to 60% of the total pore volume and more preferably, the macropore volume represents at least 35% of the total pore volume;

iii) advantageously, the volume of the pores with diameter of more than 250 Å represents 20-80% of the total pore volume measured by mercury porosimetry, preferably represents 25-60% of the total pore volume and more preferably at least 30% of the total pore volume;

a BET specific surface area in the range 100 to 550 $m^2/g$, preferably in the range 150 to 500 $m^2/g$, more preferably less than 350 $m^2/g$ and still more preferably in the range 250 $m^2/g$;

an X ray diffraction diagram which contains at least the characteristic principal peaks of at least one of the transition aluminas comprised in the group composed of rho, khi, kappa, eta, gamma, theta and delta aluminas, preferably containing at least the principal characteristic peaks of at least one of the transition aluminas comprised in the group composed of gamma, eta, theta and delta aluminas, still more preferably containing peaks with a d in the range 1.39 to 1.40 Å and with a d in the range 1.97 Å to 2.00 Å.

The phosphorus content is advantageously in the range 0.01% to 4% by weight of oxide, most preferably in the range 0.01% to 2.5% by weight of oxide.

Preferably, the catalyst is based on nickel, molybdenum and tungsten and/or nickel and tungsten.

A preferred catalyst of the invention comprises the nickel-tungsten combination and a phosphorus content in an amount in the range 0.01% to 4% by weight of oxide.

A highly preferred catalyst of the invention comprises a nickel-tungsten combination and a phosphorus content in the range 0.01% to 2.5% by weight of oxide.

Preferably, the alumina-silica comprises 30% to 50% of $Q^2$ sites, in which one atom of Si is bonded to two atoms of Si or Al and to two OH groups and also comprises 10-30% of $Q^3$ sites in which one atom of Si is bonded to three atoms of Si or Al or to one OH group.

In a preferred implementation of the invention, the catalyst support is constituted by alumina-silica alone.

In a further implementation of the invention, the support comprises 1% to 40% by weight of binder. The support may then result from a mixture of alumina-silica and at least one binder selected from the group formed by silica, alumina, clays, titanium oxide, boron oxide and zirconia.

In the catalyst, the proportion of octahedral $Al_{VI}$, determined by solid $^{27}Al$ MAS NMR, is generally more than 50%.

The catalyst may also contain a minor proportion of at least one promoter element selected from the group formed by zirconia and titanium.

Preferably, the catalyst undergoes hydrothermal treatment after synthesis, as described below.

Preferably, the catalyst undergoes a sulphurization step, as described below.

Standard Activity Test: Evaluation of Catalysts of the Invention

The acidity and hydrogenation performance of the catalysts of the invention may be evaluated by a catalytic test on a mixture of model molecules: hydrogenation of toluene and isomerization of cyclohexane.

The catalytic test to monitor catalyst hydrogenation and acidity is carried out in accordance with the following protocol:

The catalysts are sulphurized in situ, dynamically, in a tube reactor with a fixed traversed bed, in a catatest type pilot unit (Vinci Technologies), the fluids moving from top to bottom. The hydrogenating and isomerizing activity measurements were carried out immediately after sulphurization under pressure without letting in air, using the hydrocarbon feed employed to sulphurize the catalysts.

The sulphurization and test feed was composed of 5.8% of dimethyldisulphide (DMDS), 20% of toluene and 74.2% of cyclohexane by weight. The stabilized catalytic activities of equal volumes of catalyst in the toluene hydrogenation reaction were then measured. The isomerization of cyclohexane, a toluene diluent, was monitored to estimate the acidity of the catalysts.

The conditions for measuring the activity were as follows (assuming total vaporization and the perfect gas law):

Total pressure: 6.0 MPa

Toluene pressure: 0.38 MPa

Cyclohexane pressure: 1.55 MPa

Hydrogen pressure: 3.64 MPa $H_2S$ pressure: 0.22 MPa catalyst volume: 40 cc feed flow rate: 80 cc/h hourly space velocity: 2 l/l/$h^{-1}$ hydrogen flow rate: 36 l/h sulphurization and test temperature: 350° C. (3° C./min).

liquid effluent samples were analyzed by gas chromatography. Determination of the molar concentrations of unconverted toluene (T) and the concentrations of the hydrogenation products: methyl cyclohexane (MCC6), ethyl cyclopentane (EtCC5) and dimethyl cyclopentane (DMCC5) allowed the degree of toluene hydrogenation to be calculated, $X_{HYD}$, defined as:

$$X_{HYD}(\%)=100*(MCC6+EtCC5+DMCC5)/(T+MCC6+EtCC5+DMCC5)$$

The degree of cyclohexane isomerization $X_{ISO}$ was calculated in the same manner from the concentrations of unconverted cyclohexane and its reaction product, methyl cyclopentane. Since the toluene hydrogenation and cyclohexane isomerization reactions were first order under our test conditions and the reactor behaved as an ideal plug reactor, the hydrogenating activity $A_{HYD}$ and isomerization activity $A_{ISO}$ for the catalysts was calculated using the formula: $Ai=\ln(100/(100-X_i))$ Advantageously, the catalyst of the invention in the standard activity test has an activity $A_{HYD}>0.7$ and an activity $A_{ISOM}>0.1$, preferably $A_{HYD}>0.9$ and $A_{ISOM}>0.12$, more preferably $A_{HYD}>1.2$ and $A_{ISOM}>0.13$, and still more preferably $A_{HYD}>1.4$ and $A_{ISOM}>0.13$.

The ratio of the hydrogenating activity to the isomerization activity, H/A, equals $A_{HYD}/A_{ISO}$.

The ratio of the hydrogenating activity to the isomerization activity, H/A, is advantageously in the range 6.5 to 30, preferably in the range 7 to 30, more preferably in the range 7.5 to 25, more preferably in the range 8.5 to 20 and still more preferably in the range 9.5 to 15.

Preparation Processes

The catalysts of the invention may be prepared using any method known to the skilled person.

A preferred process for preparing the catalyst of the present invention comprises the following steps:

In a preferred preparation mode, the precursor is obtained by direct shaping of alumina-silica alone or my shaping alumina-silica with at least one binder, then drying and calcining. The group VIB and/or VIII elements, and optionally those selected from phosphorus, boron, silicon and optionally elements from groups VB and VIIB, are then optionally introduced using any method known to the skilled person, before or after shaping and before or after calcining the precursor or the catalyst.

The hydrogenating element may be introduced at any stage of the preparation, preferably during mixing, or more preferably after shaping. Shaping is followed by calcining, the hydrogenating element may also be introduced before or after calcining. The preparation is generally completed by calcining at a temperature of 250° C. to 600° C. A further preferred method of the present invention consists of shaping the alumina-silica without a binder after mixing the latter, then passing the paste obtained through a die to form extrudates with a diameter in the range 0.4 to 4 mm. The hydrogenating function may then be introduced in part alone (in the case, for example, of combinations of oxides of group VIB and VIII metals) or completely, at the moment of mixing. It may also be introduced by one or more ion exchange operations into the calcined support constituted by at least one alumina-silica, optionally shaped with a binder, using solutions containing precursor salts of the selected metals when these belong to group VIII. It may also be introduced by one or more operations for impregnation of the shaped and calcined support, using a solution of precursors of oxides of metals from groups VIII (in particular cobalt and nickel) when the precursors of the oxides of metals from group VIB (in particular molybdenum or tungsten) have already been introduced on mixing the support. Finally, it may also be introduced, more preferably by one or more operations for impregnating the calcined support constituted by at least one alumina-silica of the invention and optionally at least one binder, using solutions containing precursors of oxides of metals from groups vi and/or VIII, precursors of oxides of metals from group VIII preferably being introduced after those from group VIB or at the same time thereas.

Preferably, the support is impregnated using an aqueous solution. Impregnation of the support is preferably carried out using the "dry" impregnation method which is well known to the skilled person. Impregnation may be carried out in a single step using a solution containing all of the constituent elements of the final catalyst.

The catalyst of the present invention may thus comprise at least one element from group VIII such as iron, cobalt, nickel, ruthenium, rhodium, palladium, osmium, iridium or platinum. Preferred examples of group VIII metals are metals selected from the group formed by iron, cobalt, nickel, platinum, palladium and ruthenium. The catalyst of the invention may also comprise at least one element from group VIB, preferably tungsten or molybdenum. Advantageously, the following combinations of metals are used: nickel-molybdenum, cobalt-molybdenum, iron-molybdenum, iron-tungsten, nickel-tungsten, cobalt-tungsten, platinum-palladium; preferred combinations are: nickel-molybdenum, cobalt-molybdenum, cobalt-tungsten and more advantageously platinum-palladium and nickel-tungsten. It is also possible to use combinations of three metals, for example nickel-cobalt-molybdenum, nickel-molybdenum-tungsten, nickel-cobalt-tungsten. Advantageously, the following combinations are used: nickel-niobium-molybdenum, cobalt-niobium-molybdenum, iron-niobium-molybdenum, nickel-niobium-tungsten, cobalt-niobium-tungsten, iron-niobium-tungsten; preferred combinations are: nickel-niobium-molybdenum, cobalt-niobium-molybdenum. It is also possible to use combinations of four metals, for example nickel-cobalt-niobium-molybdenum. It is also possible to use combinations containing a noble metal such as ruthenium-niobium-molybdenum or ruthenium-nickel-niobium-molybdenum.

At least one of the following elements: phosphorus and possibly boron and/or silicon and possibly element(s) selected from groups VIIB and VB, are introduced into the catalyst at any stage of the preparation and using any technique which is known to the skilled person.

A preferred method of the invention consists of depositing the selected doping element or elements onto the precursor, which may or may not have been calcined, but is preferably calcined. To deposit boron, for example, an aqueous solution of at least one boron salt such as ammonium biborate or ammonium pentaborate is prepared in an alkaline medium and in the presence of hydrogen peroxide and dry impregnation is then carried out in which the pore volume of the precursor is filled with the solution containing boron, for example. In the case in which silicon is also deposited, for example, a solution of a silicone type silicon compound or a silicon oil emulsion is used.

Boron and silicon may also be deposited simultaneously using, for example, a solution containing a boron salt and a silicone type silicon compound. Thus, for example in the case in which the precursor is a nickel-tungsten type catalyst supported on alumina-silica, it is possible to impregnate this precursor using an aqueous solution of ammonium biborate and Rhodorsil E1P silicone from Rhodia, to dry, for example at 120° C., then to impregnate with a solution of ammonium fluoride, to dry at 120° C. for example, and then to calcine, for example and preferably in air in a traversed bed, for example at 500° C. for 4 hours.

The doping element selected from the group formed by phosphorus, silicon and boron and the group VIIB and VB elements may be introduced using one or more impregnation operations using an excess of solution on the calcined precursor.

When at least one doping element, P and possibly B and/or Si, is introduced, its distribution and location may be determined by techniques such as a Castaing microprobe (distribution profile of the various elements), a transmission electron microscope coupled to X ray analysis of the catalyst components, or by establishing a distribution map of the elements present in the catalyst by electronic microprobe. These techniques can show the presence of these exogenous elements added after synthesis of the alumina-silica of the invention.

It may be advantageous to prepare catalysts having homogeneous concentrations CMo, CNi, CW and CP along the extrudate. It is also advantageous to prepare catalysts having different core and peripheral CMo, CNi, CW and CP concentrations. These catalysts have "dished" or "domed" distribution profiles. A further distribution type is the crust type where the elements of the active phase are distributed on the surface.

In general, the core/periphery ratio of the concentrations CMo, CNi, CW and CP is in the range 0.1 to 3. In a variation of the invention, it is in the range 0.8 to 1.2. In a further variation of the invention, the core/periphery ratio for concentrations CP is in the range 0.3 to 0.8.

The preferred phosphorus source is orthophosphoric acid $H_3PO_4$, but salts and esters such as ammonium phosphates are also suitable. Phosphorus may, for example, be introduced in the form of a mixture of phosphoric acid and a basic organic compound containing nitrogen such as ammonia, primary and secondary amines, cyclic amines, compounds from the pyridine family and quinolines and compounds from the pyrrole family. Tungsto-phosphoric or tungsto-molybdic acids may be used.

The amount of phosphorus is adapted, without limiting the scope of the invention, to form a mixed compound in solution and/or on the support, for example tungsten-phosphorus or molybdenum-tungsten-phosphorus. Said mixed compounds may be heteropolyanions. These compounds may be Anderson heteropolyanions, for example. The phosphorus content, expressed in its $P_2O_5$ form, is in the range 0.01% to 6% by weight, preferably in the range 0.01% to 4% by weight, more preferably in the range 0.01% to 2.5%.

The boron source may be boric acid, preferably orthoboric acid $H_3BO_3$, ammonium biborate or pentaborate, boron oxide, boric esters. The boron may, for example, be introduced in the form of a mixture of boric acid, hydrogen peroxide and a basic organic compound containing nitrogen such as ammonia, primary and secondary amines, compounds from the pyridine family and quinolines and compounds from the pyrrole family. The boron may, for example, be introduced using a solution of boric acid in a water/alcohol mixture.

Many sources of silicon may be used. It is possible to use ethyl orthosilicate $Si(OEt)_4$, siloxanes, polysiloxanes, silicones, silicone emulsions, halogenated silicates such as ammonium fluorosilicate $(NH_4)_2SiF_6$ or sodium fluorosilicate $Na_2SiF_6$. silicomolybdic acid and its salts, silicotungstic acid and its salts may also advantageously be used. The silicon may, for example, be added by impregnating ethyl silicate in solution in a water/alcohol mixture. The silicon may, for example, be added by impregnating a silicone type silicon compound or silicic acid suspended in water.

The group VIB or group VIII metals of the catalyst of the present invention may be present completely or partially in the form of a metal and/or oxide and/or sulphide.

Examples of sources of molybdenum and tungsten which may be used are oxides and hydroxides, molybdic and tungstic acids and their salts, in particular ammonium salts such as ammonium molybdate, ammonium heptamolybdate, ammonium tungstate, phosphomolybdic acid, phosphotungstic acid and their salts, silicomolybdic acid, silicotungstic acid and their salts.

Sources of group VIII elements which may be used are well known to the skilled person. Examples of non noble metals are nitrates, sulphates, hydroxides, phosphates, halides, for example chlorides, bromides or fluorides and carboxylates, for example acetates and carbonates. For noble metals, halides may be used, for example chlorides, nitrates, acids such as chloroplatinic acid or oxychlorides such as ammoniacal ruthenium oxychloride.

Preferably, no other halogens apart from those introduced on impregnation area added, the halogen preferably being chlorine.

Preparation of Support

The support may be constituted by pure alumina-silica or be the result of mixing said alumina-silica with a binder such as silica ($SiO_2$), alumina ($Al_2O_3$), clays, titanium oxide ($TiO_2$), boron oxide ($B_2O_3$) or zirconia ($ZrO_2$) and any mixture of the binders cited above. Preferred binders are silica and alumina, more preferably alumina in all forms which are known to the skilled person, for example gamma alumina. The amount of binder in the catalyst support is in the range 0 to 40% by weight, more particularly between 1% and 40% and more preferably in the range 1% to 40% and more preferably in the range 5% to 20%. However, the catalysts of the invention wherein the support is constituted solely by alumina-active ingredient with no binder are preferred.

The support may be prepared by shaping the alumina-silica in the presence or absence of binder using any technique which is known to the skilled person.

Throughout the methods cited above, it may be desirable to add, during any step in the preparation, a minor proportion of at least one promoter element selected from the group formed by zirconia and titanium.

Catalyst Shaping

The catalyst may be obtained by shaping the alumina-silica using any technique which is known to the skilled person. Shaping may, for example, be carried out by extrusion, pelletization, by the oil drop coagulation method, by rotating plate granulation or by any other method which is known to the skilled person.

Shaping may also be carried out in the presence of various constituents of the catalyst and extrusion of the mineral paste obtained, by pelletization, by shaping into beads on a rotating bowl granulator or drum, by oil drop coagulation, oil-up coagulation or by any other known method for agglomeration of a powder containing alumina and optionally other ingredients selected from those mentioned above.

The catalysts used in the present invention have the shape of spheres or extrudates. However, it is advantageous that the catalyst be in the form of extrudates with a diameter in the range 0.5 to 5 mm, more particularly in the range 0.7 to 2.5 mm. The shapes are cylindrical (which may or may not be hollow), twisted cylinders, multilobes (2, 3, 4 or 5 lobes, for example), or rings. The cylindrical shape is preferably used, but any other form may be used.

Further, said catalysts used in the present invention may have been treated, as is well known to the skilled person, by additives to facilitate shaping and/or to improve the final mechanical properties of the silica-alumina catalysts. Examples of additives which may be cited are cellulose, carboxymethyl cellulose, carboxyethyl cellulose, tall oil, xanthan gums, surfactants, flocculating agents such as polyacrylamides, carbon black, starches, stearic acid, polyacrylic alcohol, polyvinyl alcohol, biopolymers, glucose, polyethylene glycols, etc.

Partial adjustment of the characteristic porosity of the supports of the invention is carried out during this step for shaping the support particles.

Shaping may be carried out using catalyst shaping techniques which are known to the skilled person, such as extrusion, pelletization, spray drying or drageification.

Water may be added or removed to adapt the viscosity of the paste to be extruded. This step may be carried out at any stage of the mixing step. In the case of alumino-silicate supports, it may be advantageous to reduce the quantity of water in the paste to increase the mechanical strength of the paste. This generally results in a reduction in the total volume for an optimum acid content.

To adapt the solid material content of the paste to be extruded to render it extrudable, it is also possible to add a mainly solid compound, preferably an oxide or hydrate. Preferably, a hydrate is used, more preferably an aluminium hydrate. The loss on ignition of the hydrate is more than 15%.

The amount of acid added on mixing before shaping is less than 30%, preferably in the range 0.5% to 20% by weight of the anhydrous mass of silica and alumina engaged in the synthesis.

Extrusion may be carried out using any conventional tool which is on the market. The paste issuing from the mixing step is extruded through a die, for example using a piston or a single or twin extrusion screw. This extrusion step may be carried out using any method which is known to the skilled person.

The catalyst extrudates of the invention generally have a crush strength of at least 70 N/cm, more preferably 100 N/cm or more.

Calcining the Support

Drying is carried out using any technique which is known to the skilled person.

To obtain the support of the present invention, it is preferable to calcine in the presence of molecular oxygen, for example by flushing with air, at a temperature of 1100° C. or less. At least one calcining step may be carried out after any one of the preparation steps. This treatment may, for example, be carried out in a traversed bed, swept bed or in a static atmosphere. As an example, the furnace used may be a rotary furnace or a vertical furnace with radial flow layers. The calcining conditions—temperature and duration—principally depend on the maximum catalyst service temperature; the preferred calcining conditions are more than one hour at 200° C. and less than one hour at 1100° C. Calcining may be carried out in the presence of steam. Final calcining may optionally be carried out in the presence of an acidic or basic vapour. As an example, calcining may be carried out in a partial pressure of ammonia.

Post-Synthesis Treatments

Post-synthesis treatments may be carried out to improve the properties of the support, in particular its homogeneity as defined above.

In one preferred implementation, the post-synthesis treatment is a hydrothermal treatment. The hydrothermal treatment is carried out using any technique which is known to the skilled person. The term "hydrothermal treatment" means contact at any stage of the manufacture of the mixed support with water in the vapour phase or in the liquid phase. The term "hydrothermal treatment" encompasses maturation, steam treatment, autoclaving, calcining in moist air, and rehydration. Without restricting the scope of the invention, such a treatment may have the effect of rendering the silica component mobile.

According to the invention, maturation may take place before or after shaping. In a preferred mode of the invention, hydrothermal treatment is carried out by steam treatment in a furnace in the presence of water vapour. The temperature during steam treatment may be in the range 600° C. to 1100° C., preferably over 700° C. for a period in the range 30 minutes to 3 hours. The steam content is more than 20 g of water per kg of dry air and preferably more than 40 g of water per kg of dry air, more preferably more than 100 g of water per kg of dry air. Such a treatment may if required completely or partially replace the calcining treatment.

The support may then optionally undergo hydrothermal treatment in a confined atmosphere. The term "hydrothermal treatment in a confined atmosphere" means treatment by using an autoclave in the presence of water at a temperature which is above ambient temperature.

During said hydrothermal treatment, the shaped alumina-silica may be treated in different manners. Thus, the alumina-silica may be impregnated with acid prior to its entry into the autoclave, alumina-silica autoclaving being carried out either in the vapour phase or in the liquid phase; said vapour or liquid phase in the autoclave may or may not be acidic. Impregnation prior to autoclaving may or may not be acidic. Said impregnation prior to autoclaving may be carried out dry or by immersing the silica-alumina in an aqueous acidic solution. The term "dry impregnation" means bringing the alumina into contact with a volume of solution which is less than or equal to the total pore volume of the treated alumina. Preferably, dry impregnation is carried out.

The autoclave is preferably a rotating basket autoclave such as that defined in EP-A-0 387 109.

The temperature during autoclaving may be in the range 100° C. to 250° C. for a period in the range 30 minutes to 3 hours.

Processes for Treatment of Hydrocarbon Feeds in Accordance with the Invention

In general, the catalysts of the invention are used for the treatment of hydrocarbon cuts, generally in the presence of hydrogen, at a temperature of 200° C. or more, at a pressure of more than 1 MPa, the space velocity being in the range 0.1 to 20 h$^{-1}$ and the quantity of hydrogen introduced being such that the volume ratio of liters of hydrogen/liters of hydrocarbon is in the range 80 to 5000 l/l.

The catalysts of the invention are advantageously used for hydrocracking/hydroconversion of hydrocarbon cuts.

The catalysts of the invention may also be used for hydrotreatment of hydrocarbon feeds, used alone or upstream of a hydrocracking/hydroconversion process on a hydrocracking catalyst based on zeolite or alumina-silica, preferably comprising nickel and tungsten.

Catalyst Sulphurization

Prior to injecting the feed, the catalysts used in the process of the present invention preferably undergoes a sulphurization treatment to at least partially transform the metallic species into sulphide prior to contact with the feed to be treated. This sulphurization activation treatment is well known to the skilled person and may be carried out using any method which has already been described in the literature, either in situ, i.e. in the reactor, or ex situ.

A conventional sulphurization method which is well known to the skilled person consists of heating in the presence of hydrogen sulphide (pure or, for example, in a stream of a hydrogen/hydrogen sulphide mixture) at a temperature in the range 150° C. to 800° C., preferably in the range 250° C. to 600° C., generally in a traversed bed reaction zone.

Feeds

Very different feeds may be treated by the processes of the invention described above and generally they contain at least 20% by volume and usually at least 80% by volume of compounds boiling above 340° C.

The feed may, for example, be LCO (light cycle oil; light gas oil from a catalytic cracking unit), atmospheric distillates, vacuum distillates, for example gas oils from straight run distillation or conversion units such as FCC, a coker or from visbreaking, and feeds from units for extraction of aromatics from lubricating oil bases or from solvent dewaxing of lubricating oil bases, or from distillates from desulphurization processes or fixed bed hydroconversion or ebullated bed atmospheric residue (AR) hydroconversion and/or RSV (vacuum residues) and/or deasphalted oils, or the feed may be a deasphalted oil, or any mixture of the feeds cited above. The above list is not limiting. Paraffins from the Fischer-Tropsch process are excluded. In general, the feeds have a boiling point T5 of more than 340° C., preferably more than 370° C., i.e. 95% of the compounds present in the feed have a boiling point of more than 340° C., and preferably more than 370° C.

The nitrogen content of the feeds treated in the processes of the invention is usually more than 500 ppm, preferably in the range 500 to 10000 ppm by weight, more preferably in the range 700 to 4000 ppm by weight and still more preferably in the range 1000 to 4000 ppm. The sulphur content of the feeds treated in the processes of the invention is usually in the range 0.01% to 5% by weight, preferably in the range 0.2% to 4% and more preferably in the range 0.5% to 2%.

The feed may optionally contain metals. The cumulative nickel and vanadium content of the feeds treated in the processes of the invention is preferably less than 1 ppm by weight.

The asphaltenes content is preferably less than 3000 ppm, preferably less than 1000 ppm, more preferably less than 200 ppm.

Guard Beds

In the case in which the feed contains resins and/or asphaltene type compounds, it is advantageous to initially pass the feed over a bed of catalyst or adsorbant which differs from the hydrocracking or hydrotreatment catalyst.

The catalysts or guard beds used in accordance with the invention have the shape of spheres or extrudates. advantageously, however, the catalyst is in the form of extrudates with a diameter in the range 0.5 to 5 mm and more particularly in the range 0.7 to 2.5 mm. The shapes are cylindrical (hollow or otherwise, twisted cylinders, multilobes (2, 3, 4 or 5 lobes, for example), rings. The cylindrical shape is preferred, but any other form may be used.

To remedy the presence of contaminants and/or poisons in the feed, the guard catalysts may, in a further preferred implementation, have more particular geometric shapes to increase their void fraction. The void fraction of these catalysts is in the range 0.2 to 0.75. Their external diameter may be between 1 and 35 mm. Non-limiting particular possible shapes are: hollow cylinders, hollow rings, Raschig rings, hollow toothed cylinders, hollow crenellated cylinders, pentaring wheels, multi-holed cylinders, etc.

These catalysts may have been impregnated with an active or inactive phase. Preferably, the catalysts are impregnated with a hydrodehydrogenating phase. More preferably, the CoMo or NiMo phase is used.

These catalysts may have macroporosity. The guard beds may be those sold by Norton-Saint-Gobain, for example MacroTrap® guard beds. The guard beds may be those sold by Axens from the ACT family: ACT077, ACT935, ACT961 or HMC841, HMC845, HMC941 or HMC945.

It may be particularly advantageous to superimpose these catalysts in at least two different beds of varying heights. Catalysts with the highest void fraction are preferably used in the first catalytic bed(s) at the inlet to the catalytic reactor. It may also be advantageous to use at least two different reactors for these catalysts.

Preferred guard beds of the invention are HMC and ACT961.

Operating Conditions

The operating conditions, such as temperature, pressure, hydrogen recycle, hourly space velocity, may vary widely depending on the nature of the feed, the desired quality of the products and the facilities available at the refinery. The hydrocracking/hydroconversion catalyst or hydrotreatment catalyst is generally brought into contact in the presence of hydrogen with the feeds described above, at a temperature of more than 200° C., usually in the range 250° C. to 480° C., advantageously in the range 320° C. to 450° C., preferably in the range 330° C. to 435° C., at a pressure of more than 1 MPa, usually in the range 2 to 25 Pa, preferably in the range 3 to 20 MPa, the space velocity being in the range 0.1 to 20 h$^{-1}$ and preferably 0.1-6 h$^{-1}$, preferably 0.2-3 h$^{-1}$, and the quantity of hydrogen introduced is such that the volume ratio of liters of hydrogen/liters of hydrocarbon is in the range 80 to 5000 l/l and usually in the range 100 to 2000 l/l.

These operating conditions used in the processes of the invention generally produce a conversion per pass into products having boiling points of less than 340° C., preferably less than 370° C., of more than 15%, preferably in the range 20% to 95%.

Implementations

The hydrocracking/hydroconversion processes using the catalysts of the invention cover pressure and conversion ranges from mild hydrocracking to high pressure hydrocracking. The term "mild hydrocracking" means hydrocracking resulting in moderate conversions, generally less than 40%, and operating at low pressure, generally in the range 2 MPa to 6 MPa.

Typical operating conditions of the process and conventional high pressure hydrocracking operating conditions can be used, without limiting the scope of the invention. Regarding the goals to reach in terms of quality of the products and of level of conversion, we can distinguish two big families of process the principal characteristics of which are in the following table:

|  | Mild hydrocracking | conventional high pressure hydrocracking |
| --- | --- | --- |
| Process | one step | one or two steps |
| Conversion wt % | 20-40 | 70-100 |
| Temp. ° C. | 350-430 | 350-430 |
| H2, pressure, MPa | 3-8 | 10-20 |
| LHSV, h-1 | 0.3-1.5 | 0.2-2.0 |
| H2/feedstock Nm$^3$/m$^3$ | 300-1000 | 800-2000 |

The mild hydrocracking process is an improved hydrotreatment process allowing a relatively low conversion (between 20 and 40%) and operating at low pressure (about 6 to 8 MPa of total pressure). The high pressure process allows a higher conversion (70 to 100% w) of vacuum distillate at high pressure (10-20 MPa).

The catalyst of the present invention may be used alone in a single or a plurality of fixed catalytic beds, in one or more reactors, in a hydrocarbon layout termed a once-through process, with or without a liquid recycle of the unconverted fraction, optionally in association with a hydrorefining catalyst located upstream of the catalyst of the present invention.

The catalyst of the present invention may be used alone, in one or more ebullated bed reactors, in a once-through hydrocracking process, with or without a liquid recycle of the unconverted fraction, optionally in association with a hydrorefining catalyst located upstream of the catalyst of the present invention.

The ebullated bed operates with withdrawal of the used catalyst and daily addition of fresh catalyst to keep the activity of the catalyst stable.

In a two-step hydrocracking process with intermediate separation between the two reaction zones, in a given step, the catalyst of the present invention may be used in one or more reactors, in combination or otherwise with a hydrorefining catalyst located upstream of the catalyst of the present invention.

Once-Through Process

Once-through hydrocracking generally comprises, firstly, deep hydrorefining aimed at deep hydrodenitrogenation and desulphurization of the feed before sending it to the hydrocracking catalyst proper, in particular when the latter comprises a zeolite. This deep hydrorefining of the feed produces only limited conversion of the feed into lighter fractions, which is insufficient and must thus be completed using the more active hydrocracking catalyst. However, it should be noted that no separation is carried out between the two types of catalyst. The whole of the effluent from the reactor is injected onto the hydrocracking catalyst proper and separation of the products formed is only carried out after this. This version of hydrocracking, once-through hydrocracking, has a variation which involves recycling the unconverted fraction to the reactor for deeper conversion of the feed.

Fixed Bed Once-Through Process

When the catalyst of the present invention is used upstream of a zeolitic hydrocracking catalyst, for example based on Y zeolite, a catalyst having a high silica content by weight is used, i.e. with silica contents in the support forming the composition of the catalyst in the range 20% to 80% by weight, preferably in the range 30% to 60%. It may also advantageously be used in association with a hydrorefining catalyst, the latter being located upstream of the catalyst of the present invention.

When the catalyst of the present invention is used upstream of a hydrocracking catalyst based on alumina-silica or zeolite, in the same reactor in distinct catalytic beds or in distinct reactors, conversion is generally (or preferably) less than 50% by weight and preferably less than 40%.

The catalyst of the invention may be used upstream or downstream of the zeolitic catalyst. Downstream of the zeolitic catalyst, it can crack HPAs. The term "HPA" means polyaromatic hydrocarbons as described in particular in the work "Hydrocracking, science and technology" by J Scherzer, M Dekker Incorporated, 1996.

Ebullated Bed Once-Through Process

The catalyst of the invention may be used alone in one or more reactors.

In the context of such a process, several reactors in series may advantageously be used, the ebullated bed reactor or reactors containing the catalyst of the invention being preceded by one or more reactors containing at least one hydrorefining catalyst in a fixed or ebullated bed.

When the catalyst of the present invention is used downstream of a hydrorefining catalyst catalyst, conversion of the fraction of the feed occasioned by said hydrorefining catalyst is generally (or preferably) less than 30% by weight and preferably less than 25%.

Fixed Bed Once-Through Process with Intermediate Separation

The catalyst of the present invention may also be used in a once-through hydrocracking process comprising a hydrorefining zone, a zone allowing partial elimination of ammonia, for example by a hot flash, and a zone comprising a hydrocracking catalyst. This process for hydrocracking hydrocarbon feeds in one step for the production of middle distillates and possibly oil bases comprises at least one first reaction zone including hydrorefining, and at least one second reaction zone, in which hydrocracking of at least a portion of the effluent from the first reaction zone is carried out. This process also comprises incomplete separation of ammonia from the effluent leaving the first zone. This separation is advantageously carried out using an intermediate hot flash. Hydrocracking in the second reaction zone is carried out in the presence of ammonia in a quantity which is lower than the quantity present in the feed, preferably less than 1500 ppm by weight, more preferably less than 1000 ppm by weight and still more preferably less than 800 ppm by weight of nitrogen.

The catalyst of the present invention is preferably used in the hydrocracking reaction zone in combination or not in combination with a hydrorefining catalyst located upstream of the catalyst of the present invention. The catalyst of the invention may be used upstream or downstream of a zeolitic catalyst. Downstream of the zeolitic catalyst, HPAs or HPA precursors may be converted.

The catalyst of the present invention may be used either in the first reaction zone for converting pretreatment, alone or in association with a conventional hydrorefining catalyst, located upstream of the catalyst of the invention, in one or more catalytic beds, in one or more reactors.

Once-Through Hydrocracking Process with Preliminary Hydrorefining on Low Acidity Catalyst the catalyst of the invention may be used in a hydrocracking process comprising:

a first hydrorefining reaction zone in which the feed is brought into contact with at least one hydrorefining catalyst having, in a standard activity test, a degree of cyclohexane conversion of less than 10% by weight;

a second hydrocracking reaction zone in which at least a portion of the effluent from the hydrorefining step is brought into contact with at least one zeolitic hydrocracking catalyst having, in the standard activity test, a degree of cyclohexane conversion of more than 10% by weight, the catalyst of the invention being present in at least one of two reaction zones.

The proportion of the catalytic volume of the hydrorefining catalyst generally represents 20% to 45% of the total catalytic volume.

The effluent from the second reaction zone is at least partially, preferably entirely introduced into the second reaction zone of said process. Intermediate gas separation may be carried out as described above.

The effluent from the second reaction zone undergoes final separation (for example by atmospheric distillation, optionally followed by vacuum distillation), to separate the gases. At least one residual liquid fraction is obtained, essentially containing products with a boiling point of generally more than 340° C., which may be recycled at least in part upstream of the second reaction zone of the process of the invention, and preferably upstream of the hydrocracking catalyst based on alumina-silica, with the aim of producing middle distillates.

The conversion of products having boiling points of less than 340° C. or less than 370° C. is at least 50% by weight.

Two-Step Process

Two-step hydrocracking comprises a first step aimed, as in the once-through process, at hydrorefining the feed, but also at producing a conversion thereof which is generally of the order of 40% to 60%. The effluent from the first step then undergoes separation (distillation) which is usually termed intermediate separation, which is aimed at separating the conversion products from the unconverted fraction. In the second step of a two step hydrocracking process, only the fraction of feed that is not converted in the first step is treated. This separation allows a two step hydrocracking process to be more selective in middle distillate (kerosene+diesel) than a once-through process. In fact, intermediate separation of the conversion products avoids "overcracking" them into naphtha and gas in the second step on the hydrocracking catalyst. Further, it should be noted that the unconverted fraction of the feed treated in the second step generally contains very small amount of $NH_3$ as well as organic nitrogen-containing compounds, in general less than 20 ppm by weight or even less than 10 ppm by weight.

The same configuration of fixed bed or ebullated bed catalytic beds may be used in the first step of a two step process as when the catalyst is used alone or in association with a conventional hydrorefining catalyst. The catalyst of the invention may be used upstream or downstream of a zeolitic catalyst. Downstream of the zeolitic catalyst, it can convert HPAs or HPA precursors.

For once-through processes and for the first step of two step hydrocracking processes, preferred catalysts of the invention are doped catalysts based on non noble group VIII elements, more preferably catalysts based on nickel and tungsten, the preferred doping element being phosphorus.

The catalysts used in the second step of the two step hydrocracking process are preferably doped catalysts based on elements from group VIII, more preferably catalysts based on platinum and/or palladium, the preferred doping element being phosphorus.

The following examples illustrate the present invention without in any way limiting its scope.

EXAMPLES

Example 1

Preparation of Catalyst C1, not in Accordance with the Invention

Support A was an alumina silica with a chemical composition of 60% by weight Al2O3 and 40% by weight of SiO2. Its Si/Al ratio was 0.6. Its sodium content was of the order of 100-120 ppm by weight. The extrudates were 1.6 mm diameter cylinders. Its specific surface area was 320 m2/g. Its total pore volume, measured by mercury porosimetry, was 0.81 cm3/g. Its pore distribution was bimodal. In the mesopore region, a broad peak between 4 and 15 nm was observed with a maximum at 7 nm in the porosity distribution dV/dD and the mean pore diameter measured by mercury porosimetry is 105 Å. The volume of mesopores with a diameter in the range 40 Å to 150 Å is 0.48 cm3/g and this volume represents about 59% of the total volume pore. The volume of macropores of the support with a diameter of more than 500 Å is 0.26 cm3/g and this volume represents about 32% of the total pore volume. The volume of the pores with a diameter of more than 250 Å is 0.29 cm3/g and this volume represents about 36% of the total pore volume.

Catalyst C1 was obtained by dry impregnation of support A, in the form of extrudates, with the characteristics described above, using an aqueous solution comprising tungsten and nickel salts. The tungsten salt was ammonium metatungstate $(NH_4)_6H_2W_{12}O_{40}*4H_2O$ and the nickel salt was nickel nitrate $Ni(NO_3)_2*6H_2O$. After maturation at ambient temperature in a water-saturated atmosphere, the impregnated extrudates were dried at 120° C. overnight then calcined at 500° C. in dry air. The final NiO content was 3.5% by weight. The final $WO_3$ content was 25% by weight.

Example 2

Preparation of Catalyst C2, not in Accordance with the Invention

Catalyst C2 was obtained by dry impregnation of catalyst C1 using a solution containing ammonium biborate $[(NH_4)_2B_4O_7*4H_2O]$ and a silicone oil in the form of a Rhodorsil EP1 emulsion from Rhodia. After maturation at ambient temperature in a water-saturated atmosphere, the impregnated extrudates were dried at 120° C. overnight then calcined at 500° C. in dry air. The final NiO content was 3.32% by weight. The final $WO_3$ content was 23.7% by weight. The final $B_2O_3$ content was 3.2% by weight. The final re-impregnated $SiO_2$ content was 2.1% by weight.

Example 3

Preparation of Catalyst C3, not in Accordance with the Invention

Catalyst C3 was obtained by dry impregnation of catalyst C1 using a solution containing ammonium biborate $[(NH_4)_2B_4O_7*4H_2O]$. After maturation at ambient temperature in a water-saturated atmosphere, the impregnated extrudates were dried at 120° C. overnight then calcined at 500° C. in dry air. The final NiO content was 3.4% by weight. The final $WO_3$ content was 24.25% by weight. The final $B_2O_3$ content was 3.2% by weight.

Example 4

Preparation of Catalyst C4, not in Accordance with the Invention

Catalyst C4 was obtained by dry impregnation of catalyst C1 using a solution containing a silicone oil in the form of a Rhodorsil EP1 emulsion from Rhodia. After maturation at ambient temperature in a water-saturated atmosphere, the impregnated extrudates were dried at 120° C. overnight then calcined at 500° C. in dry air. The final NiO content was 3.4% by weight. The final $WO_3$ content was 24.25% by weight. The final re-impregnated $SiO_2$ content was 2.0% by weight.

Example 5

Preparation of Catalyst C5, in Accordance with the Invention

Catalyst C5 was obtained by dry impregnation of support A, in the form of extrudates, with the characteristics described above, using an aqueous solution comprising tungsten and nickel salts and phosphoric acid $H_3PO_4$. The tungsten salt was ammonium metatungstate $(NH_4)_6H_2W_{12}O_{40}*4H_2O$ and the nickel salt was nickel nitrate $Ni(NO_3)_2*6H_2O$. After maturation at ambient temperature in a water-saturated atmosphere, the impregnated extrudates were dried at 120° C. overnight then calcined at 500° C. in dry air. The final NiO content was 3.5% by weight. The final $WO_3$ content was 25% by weight. The final $P_2O_5$ content was 1.9% by weight. The total volume pore of the catalyst, measured by mercury porosimetry, is 0.45 ml/g. The volume of the pores of the catalyst with diameters of more than 500 Å, measured by mercury porosimetry, is 0.10 ml/g. The volume of the pores of the catalyst with diameters of more than 250 Å, measured by mercury porosimetry, is 0.13 ml/g. The settled packing density (SPD) is 0.808 g/cm3.

Example 6

Preparation of Catalyst C6, in Accordance with the Invention

Catalyst C6 was obtained by dry impregnation of catalyst C5 using a solution containing ammonium biborate [$(NH_4)_2B_4O_7 \cdot 4H_2O$] and a silicone oil in the form of a Rhodorsil EP1 emulsion from Rhodia. After maturation at ambient temperature in a water-saturated atmosphere, the impregnated extrudates were dried at 120° C. overnight then calcined at 500° C. in dry air. The final NiO content was 3.32% by weight. The final $WO_3$ content was 23.7% by weight. The final $P_2O_5$ content was 1.8% by weight. The final $B_2O_3$ content was 3.2% by weight. The final re-impregnated $SiO_2$ content was 2.1% by weight. The total volume pore of the catalyst, measured by mercury porosimetry, is 0.44 ml/g. The volume of the pores of the catalyst with diameters of more than 500 Å, measured by mercury porosimetry, is 0.10 ml/g. The volume of the pores of the catalyst with diameters of more than 250 Å, measured by mercury porosimetry, is 0.13 ml/g. The settled packing density (SPD) is 0.83 g/cm3.

Example 7

Preparation of Catalyst C7, in Accordance with the Invention

Catalyst C7 was obtained by dry impregnation of catalyst C5 using a solution containing ammonium biborate [$(NH_4)_2B_4O_7 \cdot 4H_2O$]. After maturation at ambient temperature in a water-saturated atmosphere, the impregnated extrudates were dried at 120° C. overnight then calcined at 500° C. in dry air. The final NiO content was 3.4% by weight. The final $WO_3$ content was 24.25% by weight. The final $P_2O_5$ content was 1.84% by weight. The final $B_2O_3$ content was 3.2% by weight. The total volume pore of the catalyst, measured by mercury porosimetry, is 0.44 ml/g. The volume of the pores of the catalyst with diameters of more than 500 Å, measured by mercury porosimetry, is 0.10 ml/g. The volume of the pores of the catalyst with diameters of more than 250 Å, measured by mercury porosimetry, is 0.13 ml/g. The settled packing density (SPD) is 0.82 g/cm3.

Example 8

Preparation of Catalyst C8, in Accordance with the Invention

Catalyst C8 was obtained by dry impregnation of catalyst C5 using a solution containing a silicone oil in the form of a Rhodorsil EP 1 emulsion from Rhodia. After maturation at ambient temperature in a water-saturated atmosphere, the impregnated extrudates were dried at 120° C. overnight then calcined at 500° C. in dry air. The final NiO content was 3.4% by weight. The final $WO_3$ content was 24% by weight. The final $P_2O_5$ content was 1.82% by weight. The final re-impregnated $SiO_2$ content was 2.1% by weight. The total volume pore of the catalyst, measured by mercury porosimetry, is 0.44 ml/g. The volume of the pores of the catalyst with diameters of more than 500 Å, measured by mercury porosimetry, is 0.10 ml/g. The volume of the pores of the catalyst with diameters of more than 250 Å, measured by mercury porosimetry, is 0.13 ml/g. The settled packing density (SPD) is 0.81 g/cm3.

Example 9

Preparation of Catalyst C9, in Accordance with the Invention

Catalyst C9 was obtained by dry impregnation of support A, in the form of extrudates, with the characteristics described above, using an aqueous solution comprising tungsten and nickel salts and phosphoric acid $H_3PO_4$. The tungsten salt was ammonium metatungstate $(NH_4)_6H_2W_{12}O_{40} \cdot 4H_2O$ and the nickel salt was nickel nitrate $Ni(NO_3)_2 \cdot 6H_2O$. After maturation at ambient temperature in a water-saturated atmosphere, the impregnated extrudates were dried at 120° C. overnight then calcined at 500° C. in dry air. The final $WO_3$ content was 25% by weight. The final NiO content was 3.5% by weight. The $P_2O_5$ content was 7% by weight.

Example 10

Preparation of Catalyst C10, in Accordance with the Invention

Catalyst C10 is obtained by dry impregnation of support A, in the form of extrudate, with the characteristics described above, using an aqueous solution comprising tungsten and nickel salts and phosphoric acid $H_3PO_4$. The tungsten salt was ammonium metatungstate $(NH_4)_6H_2W_{12}O_{40} \cdot 4H_2O$ and the nickel salt was nickel nitrate $Ni(NO_3)_2 \cdot 6H_2O$. After maturation at ambient temperature in a water-saturated atmosphere, the impregnated extrudates were dried at 120° C. overnight then calcined at 500° C. in dry air. The final NiO content was 3.5% by weight. The final $WO_3$ content was 25% by weight. The final $P_2O_5$ content was 0.6% by weight. The total volume pore of the catalyst, measured by mercury porosimetry, is 0.44 ml/g. The volume of the pores of the catalyst with diameters of more than 500 Å, measured by mercury porosimetry, is 0.10 ml/g. The volume of the pores of the catalyst with diameters of more than 250 Å, measured by mercury porosimetry, is 0.13 ml/g. The settled packing density (SPD) is 0.808 g/cm3.

Example 11

Preparation of Catalyst C11, in Accordance with the Invention

Catalyst C11 is obtained by dry impregnation of support A, in the form of extrudate, with the characteristics described above, using an aqueous solution comprising tungsten and nickel salts and phosphoric acid $H_3PO_4$. The tungsten salt was ammonium metatungstate $(NH_4)_6H_2W_{12}O_{40} \cdot 4H_2O$ and the nickel salt was nickel nitrate $Ni(NO_3)_2 \cdot 6H_2O$. After maturation at ambient temperature in a water-saturated atmosphere, the impregnated extrudates were dried at 120° C. overnight then calcined at 500° C. in dry air. The final NiO content was 3.5% by weight. The final $WO_3$ content was 25% by weight. The final $P_2O_5$ content was 2.5% by weight. The total volume pore of the catalyst, measured by mercury porosimetry, is 0.45 ml/g. The volume of the pores of the catalyst with diameters of more than 500 Å, measured by mercury porosimetry, is 0.10 ml/g. The volume of the pores of the catalyst with diameters of more than 250 Å, measured by mercury porosimetry, is 0.13 ml/g. The settled packing density (SPD) is 0.81 g/cm3.

Example 12

Preparation of Catalyst C12, in Accordance with the Invention

Catalyst C12 is obtained by dry impregnation of support A, in the form of extrudate, with the characteristics described above, using an aqueous solution comprising tungsten and nickel salts and phosphoric acid $H_3PO_4$. The tungsten salt was ammonium metatungstate $(NH_4)_6H_2W_{12}O_{40}*4H_2O$ and the nickel salt was nickel nitrate $Ni(NO_3)_2*6H_2O$. After maturation at ambient temperature in a water-saturated atmosphere, the impregnated extrudates were dried at 120° C. overnight then calcined at 500° C. in dry air. The final NiO content was 3.5% by weight. The final $WO_3$ content was 25% by weight. The final $P_2O_5$ content was 2.6% by weight. The total volume pore of the catalyst, measured by mercury porosimetry, is 0.46 ml/g. The volume of the pores of the catalyst with diameters of more than 500 Å, measured by mercury porosimetry, is 0.10 ml/g. The volume of the pores of the catalyst with diameters of more than 250 Å, measured by mercury porosimetry, is 0.13 ml/g. The settled packing density (SPD) is 0.83 g/cm3.

Example 13

Preparation of Catalyst C13, in Accordance with the Invention

Catalyst C13 is obtained by dry impregnation of support A, in the form of extrudate, with the characteristics described above, using an aqueous solution comprising tungsten and nickel salts and phosphoric acid $H_3PO_4$. The tungsten salt was ammonium metatungstate $(NH_4)_6H_2W_{12}O_{40}*4H_2O$ and the nickel salt was nickel nitrate $Ni(NO_3)_2*6H_2O$. After maturation at ambient temperature in a water-saturated atmosphere, the impregnated extrudates were dried at 120° C. overnight then calcined at 500° C. in dry air. The final NiO content was 3.5% by weight. The final $WO_3$ content was 25% by weight. The final $P_2O_5$ content was 3.5% by weight. The total volume pore of the catalyst, measured by mercury porosimetry, is 0.44 ml/g. The volume of the pores of the catalyst with diameters of more than 500 Å, measured by mercury porosimetry, is 0.10 ml/g. The volume of the pores of the catalyst with diameters of more than 250 Å, measured by mercury porosimetry, is 0.13 ml/g. The settled packing density (SPD) is 0.83 g/cm3.

Example 14

Preparation of Catalyst C14, in Accordance with the Invention

Support B was an alumina-silica with a chemical composition of 70% by weight $Al_2O_3$ and 40% by weight of $SiO_2$. Its Si/Al ratio was 0.37. Its sodium content was of the order of 100 ppm by weight. The extrudates were 1.6 mm diameter cylinders. Its specific surface area was 320 m2/g. Its total volume pore, measured by mercury porosimetry, was 0.7 cm3/g. Its pore distribution was bimodal. In the mesopore region, a broad peak between 4 and 15 nm was observed with a maximum at 7 nm in the porosity distribution dV/dD and the mean pore diameter measured by mercury porosimetry is 90 Å. The volume of mesopores with a diameter in the range 40 Å to 150 Å is 0.51 cm³/g and this volume represents about 72% of the total volume pore. The volume of macropores of the support with a diameter of more than 500 Å is 0.145 cm³/g and this volume represents about 20% of the total pore volume. The volume of the pores with a diameter of more than 250 Å is 0.17 cm³/g and this volume represents about 24% of the total pore volume.

Catalyst C14 was obtained by dry impregnation of support B, in the form of extrudate, with the characteristics described above, using an aqueous solution comprising tungsten and nickel salts and phosphoric acid $H_3PO_4$. The tungsten salt was ammonium metatungstate $(NH_4)_6H_2W_{12}O_{40}*4H_2O$ and the nickel salt was nickel nitrate $Ni(NO_3)_2*6H_2O$. After maturation at ambient temperature in a water-saturated atmosphere, the impregnated extrudates were dried at 120° C. overnight then calcined at 500° C. in dry air. The final NiO content was 3.5% by weight. The final $WO_3$ content was 25% by weight. The final $P_2O_5$ content was 1.9% by weight. The total volume pore of the catalyst, measured by mercury porosimetry, is 0.44 ml/g. The volume of the pores of the catalyst with diameters of more than 500 Å, measured by mercury porosimetry, is 0.10 ml/g. The volume of the pores of the catalyst with diameters of more than 250 Å, measured by mercury porosimetry, is 0.13 ml/g. The settled packing density (SPD) is 0.82 g/cm3.

Example 15

Preparation of Catalyst C15, in Accordance with the Invention

Support C was an alumina-silica with a chemical composition of 81% by weight $Al_2O_3$ and 19% by weight of $SiO_2$. Its Si/Al ratio was 0.2. Its sodium content was of the order of 100 ppm by weight. The extrudates were 1.6 mm diameter cylinders. Its specific surface area was 320 m2/g. Its total volume pore, measured by mercury porosimetry, was 0.61 cm3/g. Its pore distribution was bimodal. In the mesopore region, a broad peak between 4 and 15 nm was observed with a maximum at 7 nm in the porosity distribution dV/dD and the mean pore diameter measured by mercury porosimetry is 85 Å. The volume of mesopores with a diameter in the range 40 Å to 150 Å is 0.45 cm³/g and this volume represents about 74% of the total volume pore. The volume of macropores of the support with a diameter of more than 500 Å is 0.10 cm3/g and this volume represents about 16% of the total pore volume. The volume of the pores with a diameter of more than 250 Å is 0.13 cm³/g and this volume represents about 21% of the total pore volume.

Catalyst C15 was obtained by dry impregnation of support C, in the form of extrudates, with the characteristics described above, using an aqueous solution comprising tungsten and nickel salts and phosphoric acid $H_3PO_4$. The tungsten salt was ammonium metatungstate $(NH_4)_6H_2W_{12}O_{40}*4H_2O$ and the nickel salt was nickel nitrate $Ni(NO_3)_2*6H_2O$. After maturation at ambient temperature in a water-saturated atmosphere, the impregnated extrudates were dried at 120° C. overnight then calcined at 500° C. in dry air. The final NiO content was 3.5% by weight. The final $WO_3$ content was 25% by weight. The final $P_2O_5$ content was 2% by weight. The total volume pore of the catalyst, measured by mercury porosimetry, is 0.4 ml/g. The volume of the pores of the catalyst with diameters of more than 500 Å, measured by mercury porosimetry, is 0.10 ml/g. The volume of the pores of the catalyst with diameters of more than 250 Å, measured by mercury porosimetry, is 0.13 ml/g. The settled packing density (SPD) is 0.82 g/cm3.

The final weight contents of $WO_3$, NiO, $P_2O_5$, $SiO_2$ and $B_2O_3$ of the catalysts are shown in Table 1 below.

TABLE 1

WO$_3$, NiO, P$_2$O$_5$, SiO$_2$ and B$_2$O$_3$ weight contents in catalysts C1 to C15

|  | C1 | C2 | C3 | C4 | C5 | C6 | C7 | C8 | C9 |
|---|---|---|---|---|---|---|---|---|---|
| NiO (wt %) | 3.5 | 3.32 | 3.4 | 3.36 | 3.5 | 3.32 | 3.4 | 3.36 | 3.5 |
| WO$_3$ (wt %) | 25 | 23.7 | 24.25 | 24 | 25 | 23.7 | 24.25 | 24 | 25 |
| P$_2$O$_5$ (wt %) | 0 | 0 | 0 | 0 | 1.9 | 1.8 | 1.84 | 1.82 | 7 |
| B$_2$O$_3$ (wt %) | 0 | 3.2 | 3.2 | 0 | 0 | 3.2 | 3.2 | 0 | 0 |
| SiO$_2$ (wt %) deposited on the support | 0 | 2.1 | 0 | 2.0 | 0 | 2.1 | 0 | 2.1 | 0 |

|  | C10 | C11 | C12 | C13 | C14 | C15 |
|---|---|---|---|---|---|---|
| NiO (wt %) | 3.5 | 3.5 | 3.5 | 3.5 | 3.5 | 3.5 |
| WO$_3$ (wt %) | 25 | 25 | 25 | 25 | 25 | 25 |
| P$_2$O$_5$ (wt %) | 0.6 | 2.5 | 2.6 | 3.5 | 1.9 | 2 |
| B$_2$O$_3$ (wt %) | 0 | 0 | 0 | 0 | 0 | 0 |
| SiO$_2$ (wt %) deposited on the support | 0 | 0 | 0 | 0 | 0 | 0 |

Example 10

Evaluation of Catalysts C1 to C15

Catalysts C1 to C15 the preparation of which was described in Examples 1 to 15 were used to carry out hydrocracking of a vacuum distillate with the following principal characteristics:

|  | Nature of feed | Vacuum distillates |
|---|---|---|
|  | Density at 20° C. | 0.904 |
|  | Sulphur, % by weight | 2.2 |
|  | Nitrogen, ppm by weight | 620 |
| Simulated distillation: | SD: Initial point, ° C. | 345 |
|  | SD: 05% p, ° C. | 368 |
|  | SD: 10% p, ° C. | 375 |
|  | SD: 50% p, ° C. | 402 |
|  | SD: 90% p, ° C. | 428 |
|  | SD: End point, ° C. | 467 |

Catalysts C1 to C15 were employed using the process of the invention with a pilot unit comprising 1 fixed traversed bed reactor, the fluids moving from bottom to top (up-flow).

Prior to the hydrocracking test, the catalysts were sulphurized at 140 bars, at 350° C. using a straight run gas oil supplemented with 2% by weight of DMDS.

After sulphurization, the catalytic tests were carried out under the following conditions:

Total pressure 14 MPa T=400° C.

Hourly space velocity (HSV)=0.65 h$^{-1}$.

The catalytic performances were expressed as the net conversion into products with a boiling point of less than 380° C., as the net selectivity for middle distillate, 150-380° C. cut, and as the ratio of gas oil yield/kerosene yield in the middle distillate fraction. They were derived from the results for simulated distillation.

The net conversion, NC, was assumed to be:

$$NC\ 380°\ C.=[(\%\ of\ 380°\ C.^-_{effluents})-(\%\ of\ 380°\ C.^-_{feed})]/[100-(\%\ of\ 380°\ C.^-_{feed})]$$

in which

% of 380° C.$^-_{effluents}$=weight content of compounds with boiling points lower than 380° C. in the effluents; and % of $^{380°}$ C.$^-_{feed}$=weight content of compounds with boiling points lower than 380° C. in the feed.

The gross selectivity for middle distillate, GS, was defined as:

$$GS=[(fraction\ of\ 150\text{-}380_{effluents})]/[(\%\ of\ 380°\ C.^-_{effluents})].$$

TABLE 1

Catalytic results for once-through hydrocracking at high pressure:

| Catalyst | Temperature for 80% net conversion | GS, weight % Middle distillate (MD) | Go/Ker ratio wt %/wt % |
|---|---|---|---|
| C1 | 398 | 69 | 1.50 |
| C2 (BSi) | 394 | 69 | 1.40 |
| C3 (B) | 396 | 69 | 1.45 |
| C4 (Si) | 396 | 69 | 1.47 |
| C5 (P) | 392 | 70.5 | 1.50 |
| C6 (PBSi) | 388 | 70.5 | 1.40 |
| C7 (PB) | 390 | 70.5 | 1.45 |
| C8 (PSi) | 390 | 70.5 | 1.47 |
| C9 (P) | 398 | 69 | 1.47 |
| C10 (P) | 392 | 70.5 | 1.50 |
| C11 (P) | 392 | 70.5 | 1.50 |
| C12 (P) | 394 | 69 | 1.45 |
| C13 (P) | 394 | 69 | 1.40 |
| C14 | 392 | 70.5 | 1.50 |
| C15 | 396 | 69 | 1.45 |

Results Displaying the Advantage of Using Phosphorus as Doping Element:

It is interesting to note that catalysts C3 and C4, which respectively only contain Boron and silica as doping element are less selective for middle distillate than catalyst C5 which only contains Phosphorus as doping element. Moreover, in the middle distillate fraction, the gas oil/kerosene ratio is lower than the one obtained with catalyst C5.

Furthermore, the use of catalyst C2 with the combination of boron and silica displays a lower gas oil/kerosene ratio in comparison with a catalyst containing phosphorus.

Thus, the catalytic results indicate that catalyst C5 supported on a specific alumina silica of the invention the formulation of the active phase of which contains an adapted amount of phosphorus in accordance with the invention has high conversion and principally highly selective for middle distillates. Further, in the middle distillate fractions, we obtained a high gas oil/kerosene ratio. Catalyst C5 thus has a particularly high selectivity for middle distillates for gas oil, a fraction which is particularly sought after by refiners. The performance of catalyst C5 is linked to the particular acidity of catalyst C5 which is supported on a particular alumina silica. The use of this alumina silica as a support is thus particularly advantageous in obtaining highly active hydrocracking catalysts which are highly selective towards middle distillates. It appears that the use of phosphorus as doping element is preferable that the use of boron, silica and even that the use of the combination of boron and silica.

It should be emphasized that catalysts C6, C7 and C8 obtained from catalyst C5, respectively by addition of BSi, B and Si, have improved activities with respect to with catalyst C5. The selectivity for middle distillates is identical. However, in catalysts C6, C7 and C8, we observed that the gas oil/kerosene ratio is slightly different from that of catalyst C5. With an increase in catalyst activity, we observed a reduction in the gas oil/kerosene ratio, and then a selectivity in middle distillate lower in gas oil which is the fraction particularly sought after in comparison with a catalyst containing a limited content in phosphorus.

Results Displaying the Advantage of Using a Catalyst Containing a Limited Content of Phosphorus.

Table 2 displays a selectivity in middle distillate (70.5% by weight) and a gas oil/kerosene ratio (1.5) particularly high for catalysts C5, C10 and C11 in accordance of the invention in comparison with catalysts C12 and C13 only containing phosphorus and then also in accordance with the invention.

It appears that these catalysts C5, C10 and C11 which have a content of phosphorus selected in the preferential range 0.01% to 2.5% by weight of the phosphorus doping element oxide, display improved catalytic performances and are particularly adapted for the production of middle distillate in accordance with the goal of the invention.

Furthermore, the catalytic results obtained for catalyst C9 display a lower conversion when the phosphorus content in the catalyst (7% by weight of P2O5) is not in accordance with the invention.

Results Displaying the Advantage of Using a Catalyst with a Support Containing a Selected Content of Silica.

Table 2 displays that catalyst with a support containing a selected content of silica in the range strictly greater than 25% and lower that 50% display improved catalytic performances in terms of selectivity and gas oil/kerosene ratio and are particularly adapted for the production of middle distillate in accordance of the goal of the invention.

The invention claimed is:

1. A catalyst comprising at least one hydrodehydrogenating element selected from the group consisting of elements from group VIB and group VIII of the periodic table, 0.6% to 2.5% of phosphorus, said catalyst having a total volume pore, measured by mercury porosimetry, in the range of 0.35 to 0.74 ml/g, and a non-zeolitic support comprising alumina-silica, said alumina-silica having the following characteristics:
   a percentage of silica in the range of 5% to 95% by weight;
   a sodium content of less than 0.03% by weight;
   a total pore volume, measured by mercury porosimetry, in the range of 0.45 to 0.96 ml/g;
   a porosity such that:
      i) the volume of mesopores with a diameter in the range of 40 Å to 150 Å and with a mean pore diameter in the range of 80 Å to 140 Å represents 40-70% of the total pore volume measured by mercury porosimetry;
      ii) the volume of macropores with a diameter of more than 500 Å represents 30-60% of the total pore volume measured by mercury porosimetry;
   a BET specific surface area in the range of 100 to 550 m$^2$/g;
an X ray diffraction diagram which contains at least the principal characteristic peaks of at least one of the transition aluminas included in the group composed of alpha, rho, khi, eta, gamma, kappa, theta and delta aluminas.

2. A catalyst according to claim 1 in which the percentage of silica is strictly greater than 25% and lower than 50% by weight.

3. A catalyst according to claim 2 in which the percentage of silica is strictly greater than 25% and lower than 42% by weight.

4. A catalyst according to claim 1 in which the total volume pore of the catalyst, measured by mercury porosimetry is between 0.4 and 0.6 ml/g.

5. A catalyst according to claim 1, having a settled packing density greater than 0.7 g/cm3.

6. A catalyst according to claim 1, in which the catalyst also contain boron and/or silicon.

7. A catalyst according to claim 1, comprising molybdenum and tungsten.

8. A catalyst according to claim 1, comprising nickel and tungsten.

9. A catalyst according to claim 1, having a proportion of octahedral Al$_{VI}$ determined by solid $^{27}$Al MAS NMR analysis of more than 50%.

10. A catalyst according to claim 1, in which the alumina-silica comprises 30% to 50% of Q$^2$ sites, in which one Si atom is bonded to two atoms of Si or Al and to two OH groups, and also comprises 10-30% of Q$^3$ sites, in which one Si atom is bonded to three atoms of Si or Al or to one OH group.

11. A catalyst according to claim 1, in which the support is constituted by alumina-silica.

12. A catalyst according to claim 1, in which the support comprises 1% to 40% by weight of binder.

13. A catalyst according to claim 8, in which the support results from mixing alumina-silica and at least one binder selected from the group consisting of silica, alumina, clays, titanium oxide, boron oxide and zirconia.

14. A catalyst according to claim 1, in which the support has a porosity such that the volume of the pores with diameter of more than 250 Å represents 20-80% of the total pore volume measured by mercury porosimetry.

15. A catalyst according to claim 1, comprising at least one element from group VIIB.

16. A catalyst according to claim 1, comprising at least one element from group VB.

17. A catalyst according to claim 1, in which the X ray diffraction diagram contains at least the principal characteristic peaks of at least one transition alumina included in the group composed of eta, theta, delta and gamma aluminas.

18. A catalyst according to claim 1, in which the BET specific surface area is in the range of 150 to 500 m$^2$/g.

19. A catalyst according to claim 1, in which the support comprises at least two alumino-silicate zones having Si/Al ratios which are greater than or less than the overall Si/Al ratio determined by X ray fluorescence.

20. A catalyst according to claim 1, in which the support comprises a single alumino-silicate zone having an Si/Al ratio equal to the overall Si/Al ratio determined by X ray fluorescence and less than 2.3.

21. A catalyst according to claim 1, comprising a minor proportion of at least one promoter element selected from the group consisting of zirconia and titanium.

22. A catalyst according to claim 1, having undergone a sulphurization treatment.

23. A catalyst according to claim 1, having undergone a hydrothermal treatment.

24. A catalyst according to claim 1, which by a standard activity test, has a hydrogenating activity $A_{HYD}>0.7$ and an isomerization activity $A_{isom}>0.1$.

25. A catalyst according to claim 24, having a ratio $A_{HYD}/A_{ISOM}$ in the range of 6.5 to 30.

26. A catalytic process comprising subjecting a hydrocarbon feed to a hydrocracking/hydroconversion process wherein the catalyst is according to claim 1.

27. A hydrocracking/hydroconversion process according to claim 26, carried out using a once-through process.

28. A hydrocracking and/or hydroconversion process according to claim 26, comprising at least one first hydrorefining reaction zone and at least one second reaction zone comprising hydrocracking at least a portion of the effluent from the first zone and comprising incomplete separation of ammonia from the effluent leaving the first zone.

29. A hydrocracking/hydroconversion process according to claim 26, comprising:
  a first hydrorefining reaction zone in which the feed is brought into contact with at least one hydrorefining catalyst having, by a standard activity test, a degree of cyclohexane conversion of less than 10% by weight;
  a second hydrocracking reaction zone in which at least a portion of the effluent from the hydrorefining step is brought into contact with at least one zeolitic hydrocracking catalyst having, by a standard activity test, a degree of cyclohexane conversion of more than 10% by weight.

30. A hydrocracking/hydroconversion process according to claim 26, conducted by a two step process.

31. A process according to claim 26, operating in the presence of hydrogen, at a temperature of more than 200° C., at a pressure of more than 1 MPa, at a space velocity in the range of 0.1 to 20 $h^{-1}$ and hydrogen is introduced such that the liters of hydrogen/liters of hydrocarbon volume ratio is in the range of 80 to 5000l/l.

32. A hydrocracking/hydroconversion process according to claim 26, operating at a pressure in the range of 2 to 6 MPa and resulting in conversions which are below 40%.

33. A process according to claim 26, operating in fixed bed mode.

34. A process according to claim 26, operating in ebullated bed mode.

35. A catalytic process comprising subjecting a hydrocarbon feed to hydrotreatment wherein the catalyst is according to claim 1.

36. A process according to claim 35, placed upstream of a hydrocracking process.

37. A process according to claim 36, in which the hydrocracking catalyst comprises nickel and tungsten.

38. A process according to claim 26, in which the hydrocarbon feeds are selected from LCO (light cycle oil—light gas oil from a catalytic cracking unit), atmospheric distillates, vacuum distillates, feeds from units for extracting aromatics from lubricating oil bases or from solvent dewaxing of lubricating oil bases, distillates from desulphurization or fixed bed hydroconversion or atmospheric residue ebullated bed hydroconversion and/or RSV (vacuum residue) and/or deasphalted oils, or deasphalted oil, used alone or as a mixture.

39. A process according to claim 26, in which the feed initially passes over a bed of catalyst or adsorbent different from the hydrocracking/hydroconversion or hydrotreatment catalyst.

* * * * *